(12) United States Patent
Wang et al.

(10) Patent No.: US 11,812,030 B2
(45) Date of Patent: Nov. 7, 2023

(54) ENTROPY CODING FOR MOTION PRECISION SYNTAX

(71) Applicants: Beijing Bytedance Network Technology Co., Ltd., Beijing (CN); Bytedance Inc., Los Angeles, CA (US)

(72) Inventors: Yang Wang, Beijing (CN); Li Zhang, San Diego, CA (US); Zhipin Deng, Beijing (CN); Kai Zhang, San Diego, CA (US); Hongbin Liu, Beijing (CN)

(73) Assignees: BEIJING BYTEDANCE NETWORK TECHNOLGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/976,189

(22) Filed: Oct. 28, 2022

(65) Prior Publication Data
US 2023/0115118 A1  Apr. 13, 2023

Related U.S. Application Data

(63) Continuation of application No. PCT/CN2021/091869, filed on May 6, 2021.

(30) Foreign Application Priority Data

May 1, 2020  (WO) ................ PCT/CN2020/088546

(51) Int. Cl.
*H04N 19/137*  (2014.01)
*H04N 19/119*  (2014.01)
(Continued)

(52) U.S. Cl.
CPC ........ *H04N 19/137* (2014.11); *H04N 19/119* (2014.11); *H04N 19/176* (2014.11); *H04N 19/189* (2014.11); *H04N 19/70* (2014.11)

(58) Field of Classification Search
None
See application file for complete search history.

(56) References Cited

U.S. PATENT DOCUMENTS

2020/0053367 A1  2/2020  Young et al.
2021/0329233 A1  10/2021  Tsai
2022/0159291 A1*  5/2022  Salehifar ............. H04N 19/109

FOREIGN PATENT DOCUMENTS

CN  104768016 A  7/2015
CN  109792539 A  5/2019
(Continued)

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

(Continued)

Primary Examiner — Christopher Braniff
(74) Attorney, Agent, or Firm — Conley Rose, P.C.

(57) ABSTRACT

Systems, methods and apparatus for video processing are described. The video processing may include video encoding, video decoding, or video transcoding. One example method of video processing includes performing a conversion between a block of a video and a bitstream of the video according to a rule. The conversion is based on an adaptive motion vector difference resolution (AMVR) tool, and the rule specifies that selection of a context for a first bin within a bin string of a first syntax element that specifies the resolution of the motion vector difference associated with an AMVR shift is derived based on usage of a coding mode for the block.

18 Claims, 19 Drawing Sheets

(51) Int. Cl.
*H04N 19/176* (2014.01)
*H04N 19/189* (2014.01)
*H04N 19/70* (2014.01)

(56) References Cited

FOREIGN PATENT DOCUMENTS

| CN | 110677655 A | 1/2020 |
|---|---|---|
| WO | 2018066242 A1 | 4/2018 |
| WO | 2020085954 A1 | 4/2020 |
| WO | 2020192747 A1 | 10/2020 |

OTHER PUBLICATIONS

Suehring, K., Retrieved from the internet: https://vcgit.hhi.fraunhofer.de/jvet/VVCSoftware_VTM/-/tags/VTM-8.0, Jan. 17, 2023, 2 pages.
Document: JVET-N0280, Bross, B., et al., CE8: Residual Coding for Transform Skip Mode (CE8-4.3a, CE8-4.3b, CE8-4.4a, and CE8-4.4b), Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-P0476, Chao, Y-H., et al., "Non-CE8: Palette mode and prediction mode signaling," Joint Video Experts Team (JVET) of ITU-T SG 16 WP 3 and ISO/IEC JTC 1/SC 29/WG 11 16th Meeting: Geneva, CH, Oct. 1-11, 2019, 13 pages.
Document: JVET-Q0449-v2, Bross, B., et al., "On smoothing filter with RPR in VVC," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JVET-K0111-v1, Park, M., et al., "CE1: Picture Boundary Split in JVET-J0024 (Test 2.0.12)," Joint Video Experts Team (JVET) of ITU-T SG 16 WP 3 and ISO/IEC JTC 1/SC 29/WG 11 11th Meeting: Ljubljana, SI, Jul. 10-18, 2018, 3 pages.
Document: JVET-M0464-v4, Bross, B., et al., "Non-CE8: Unified Transform Type Signalling and Residual Coding for Transform Skip," Joint Video Experts Team (JVET) of ITU-T SG 16 WP 3 and ISO/IEC JTC 1/SC 29/WG 11 13th Meeting: Marrakech, MA, Jan. 9-18, 2019, 13 pages.
Document: JVET-N0112-v1, Hsiang, S., et al., "Simplification of context modeling for coding CU split decisions," Join Video Experts Team (JVET) of ITU-T SG 16 WP 3 and ISO/IEC JTC 1/SC 29/WG 11 14th Meeting: Geneva, CH, Mar. 19-27, 2019, 6 pages.

Document: JVET-M0877-v2, Zhao, X., "BoG report on CE6 related contributions," Joint Video Experts Team (JVET) of ITU-T SG 16 WP 3 and ISO/IEC JTC 1/SC 29/WG 11 13th Meeting: Marrakech, MA, Jan. 9-18, 2019, 17 pages.
Foreign Communication From a Related Counterpart Application, PCT Application No. PCT/CN2021/091869, International Search Report dated Jul. 30, 2021, 13 pages.
Foreign Communication From a Related Counterpart Application, PCT Application No. PCT/CN2021/091870, International Search Report dated Aug. 11, 2021, 10 pages.
Notice of Allowance dated Mar. 24, 2023, 13 pages, U.S. Appl. No. 17/977,6930, filed Oct. 31, 2022.
Non-Final Office Action dated Mar. 24, 2023, 22 pages, U.S. Appl. No. 18/076,045, filed Dec. 6, 2022.
Document: JVET-M0421, Wieckowski, A., et al., "Non-CE1: Split-first signalling for partitioning," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages. abstract, section 3.3, section 4.
Document: JVET-R2001-v4, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 522 pages. section 9.3.4.2.3.
Document: JVET-M0246_r1, Liu, H., et al., "CE2: Adaptive Motion Vector Resolution for Affine Inter Mode (Test 2.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 10 pages. abstract, sections 1 and 4; table 9-10, p. 3.
Document: JVET-N0434, Yang, Y., et al., "Non-CE4: Unified context model of AMVR and Affine AMVR," Joint Video Experts Team (JVET) of ITU-T SG 16 WP 3 and ISO/IEC JTC 1/SC 29/WG 11 14th Meeting: Geneva, CH, Mar. 19-27, 2019, 3 pages. abstract, tables 1, 2.
Document: JVET-R2001-v4, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 522 pages. table 131.
Foreign Communication From A Related Counterpart Application, European Application No. 21795484.1, Extended European Search Report dated Aug. 16, 2023, 15 pages.
Foreign Communication From A Related Counterpart Application, European Application No. 21795487.4, Extended European Search Report dated Jul. 27, 2023, 10 pages.

\* cited by examiner

1900 performing a conversion between a block of a video and a bitstream of the video according to a rule, where the conversion is based on an adaptive motion vector difference resolution (AMVR) tool, and the rule specifies that selection of a context for a first bin within a bin string of a syntax element that specifies the resolution of the motion vector difference associated with an AMVR shift is derived based on usage of an intra block copy (IBC) mode and usage of an affine mode for the block — 1910

FIG. 19 performing a conversion between a current block of a video and a bitstream of the video according to a rule specifying that whether to use context coding or bypass coding for a syntax element specifying a sign of a transform coefficient level is based on a number of remaining allowed context coded bins or a type of transform used for the current block — 2010

ENTROPY CODING FOR MOTION PRECISION SYNTAX

CROSS REFERENCE TO RELATED APPLICATIONS

This application is a continuation of International Patent Application No. PCT/CN2021/091869 filed on May 6, 2021, which claims the priority to and benefits of International Patent Application No. PCT/CN2020/088546 filed on May 1, 2020. All the aforementioned patent applications are hereby incorporated by reference in their entireties.

TECHNICAL FIELD

This disclosure is related to video and image coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for performing encoding or decoding using context based coding and decoding.

In one example aspect, a method of processing video is disclosed. The method includes performing a conversion between a video block of a video and a coded representation of the video, wherein the coded representation conforms to a format rule, wherein the conversion is based on an adaptive motion vector difference resolution (AMVR) tool in which a representation of a motion vector or a motion vector difference or a motion vector predictor for the video block is represented in the coded representation using an adaptive resolution; wherein the format rule specifies to represent use of the adaptive resolution in the coded representation by context modeling that is dependent on a coded information of the video block or a neighboring block of the video block.

In another example aspect, another method of processing video is disclosed. The method includes performing a conversion between a video block of a video and a coded representation of the video, wherein the coded representation conforms to a format rule, wherein the conversion is based on an adaptive motion vector difference resolution (AMVR) tool in which a representation of a motion vector or a motion vector difference or a motion vector predictor for the video block is represented in the coded representation using an adaptive resolution; wherein the format rule specifies how to represent use of the adaptive resolution in the coded representation by context modeling such that contexts used for coding a first bin and a second bin for an index of a precision used by the AMVR tool.

In another example aspect, another method of processing video is disclosed. The method includes performing a conversion between a video comprising one or more video pictures comprising a plurality of video blocks and a coded representation of the video, wherein the coded representation conforms to a format rule for signaling information about adaptive motion vector difference resolution (AMVR) coding of one or more video blocks; wherein the format rule specifies that a same context is used for coding a bin of an AMVR precision index of a first video block coded using a first coding mode and a bin of an AMVR precision index of a second video block coded using a second coding mode.

In another example aspect, another method of processing video is disclosed. The method includes performing a conversion between video block of a video and a coded representation of the video, wherein the video block is split into one or more vertical and/or one or more horizontal partitions, wherein the coded representation conforms to a format rule that specifies context-based coding of splitting information for the video block.

In another example aspect, another method of processing video is disclosed. The method includes performing a conversion between video block of a video and a coded representation of the video, wherein the coded representation conforms to a format rule, wherein the format rule specifies a coding condition used to decide between using context coding or bypass coding for representing a sign of a transform coefficient.

In another example aspect, another method of processing video is disclosed. The method includes performing a conversion between video block of a video and a coded representation of the video, wherein the coded representation conforms to a format rule, wherein the format rule specifies that at a beginning of a bypass coding for remaining syntax elements in a third or a remainder coefficient scan pass of the transform skip residual coding process, an operation is applied to a variable specifying the number of the remaining allowed context coded bins.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present disclosure.

BRIEF DESCRIPTION OF THE DRAWINGS

FIG. 19 is a flowchart representation of another video processing method in accordance with one or more embodiments of the present technology.

FIG. 20 is a flowchart representation of yet another video processing method in accordance with one or more embodiments of the present technology.

DETAILED DESCRIPTION

The present disclosure provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present disclosure for ease of understanding and do not limit the embodiments and techniques to the corresponding sections. As such, embodiments from one section can be combined with embodiments from other sections.

1. Overview

This disclosure is related to video coding technologies. Specifically, it is related Adaptive Motion Vector Resolution (AMVR), block partitioning, and other coding tools in image/video coding. It may be applied to the existing video coding standard like high efficiency video coding (HEVC), or the versatile video coding (VVC) standard to be finalized. It may be also applicable to future video coding standards or video codec.

2. Initial Discussion

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Coding Flow of a Typical Video Codec

Figure 1:
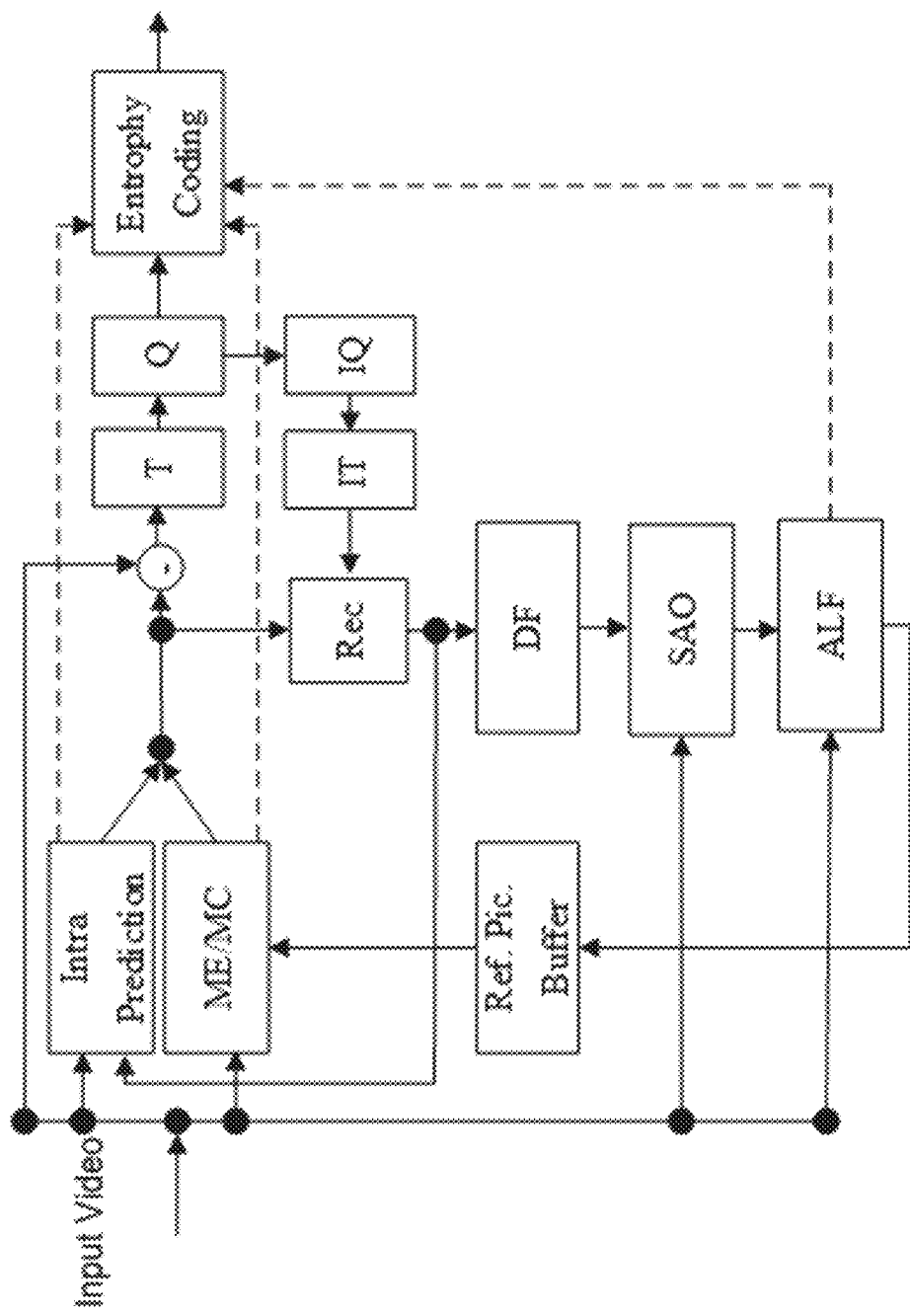
FIG. 1 shows an example of encoder block diagram.

FIG. 1 shows an example of an encoder block diagram of VVC, which contains three in-loop filtering blocks: deblocking filter (DF), sample adaptive offset (SAO), and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.2. Intra Mode Coding with 67 Intra Prediction Modes

To capture the arbitrary edge directions presented in natural video, the number of directional intra modes is extended from 33, as used in HEVC, to 65. The additional directional modes are depicted as dotted arrows in FIG. 2, and the planar and direct current (DC) modes remain the same. These denser directional intra prediction modes apply for all block sizes and for both luma and chroma intra predictions.

Figure 2:
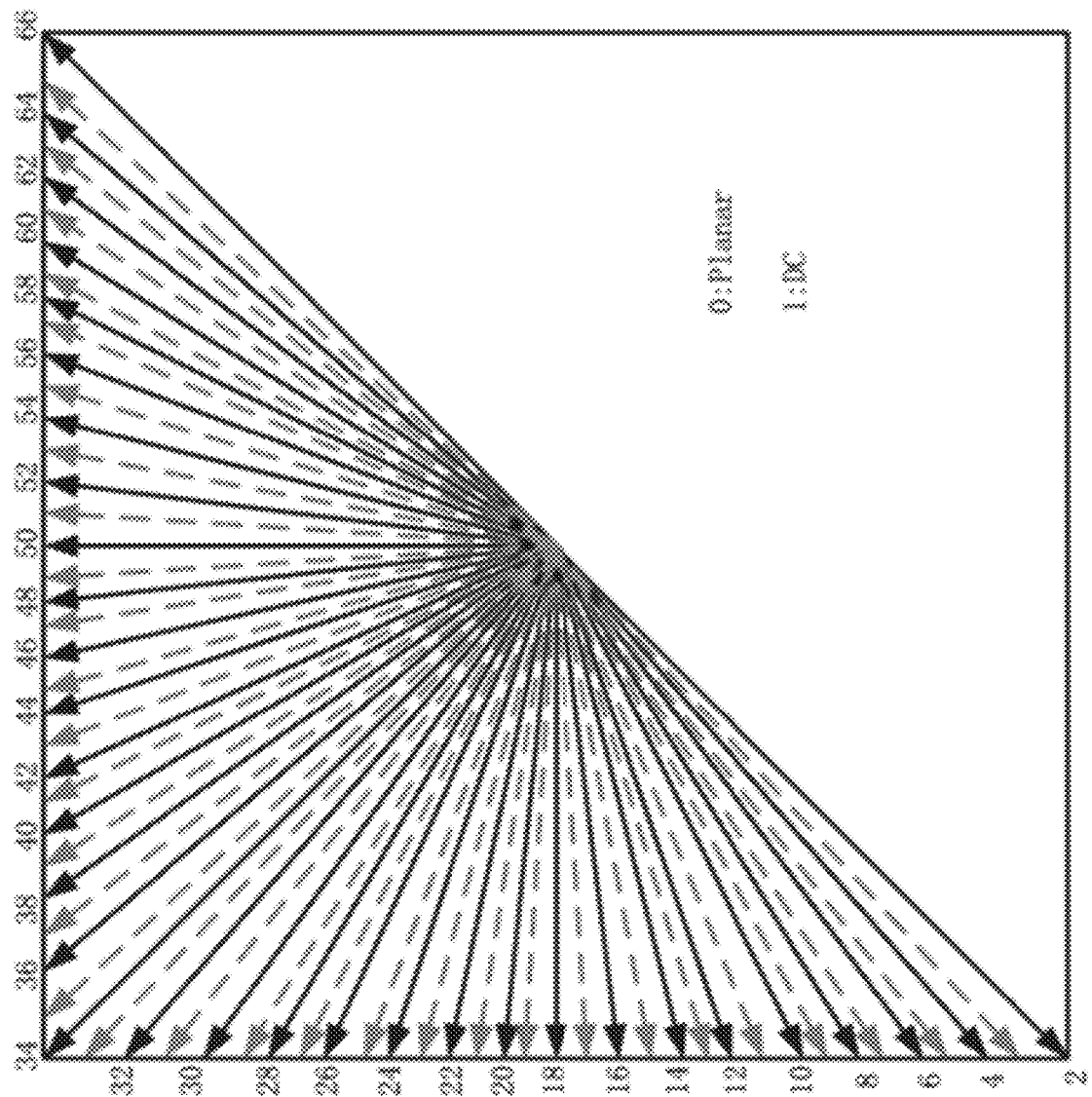
FIG. 2 shows an example of 67 intra prediction modes.

Conventional angular intra prediction directions are defined from 45 degrees to −135 degrees in clockwise direction as shown in FIG. 2. In the VVC test model (VTM), several conventional angular intra prediction modes are adaptively replaced with wide-angle intra prediction modes for the non-square blocks. The replaced modes are signalled using the original method and remapped to the indexes of wide angular modes after parsing. The total number of intra prediction modes is unchanged, e.g., 67, and the intra mode coding is unchanged.

In the HEVC, every intra-coded block has a square shape and the length of each of its sides is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.3. Inter Prediction

For each inter-predicted coding unit (CU), motion parameters consisting of motion vectors, reference picture indices and reference picture list usage index, and additional information needed for the new coding feature of VVC are used for inter-predicted sample generation. The motion parameter can be signalled in an explicit or implicit manner. When a CU is coded with skip mode, the CU is associated with one prediction unit (PU) and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

2.4. Intra Block Copy (IBC)

Intra block copy (IBC) is a tool adopted in HEVC extensions on screen content coding (SCC). It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs rate distortion (RD) check for blocks with either width or height no larger than 16 luma samples. For non-merge mode, the block vector search is performed using hash-based search first. If hash search does not return valid candidate, block matching based local search will be performed.

In the hash-based search, hash key matching (32-bit cyclic redundancy check (CRC)) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current coding tree units (CTUs).

At CU level, IBC mode is signalled with a flag and it can be signalled as IBC AMVP mode or IBC skip/merge mode as follows:
  IBC skip/merge mode: a merge candidate index is used to indicate which of the block vectors in the list from neighbouring candidate IBC coded blocks is used to predict the current block. The merge list consists of spatial, history-based Motion Vector Prediction (HMVP), and pairwise candidates.
  IBC AMVP mode: block vector difference is coded in the same way as a motion vector difference. The block vector prediction method uses two candidates as predictors, one from left neighbour and one from above neighbour (if IBC coded). When either neighbour is not available, a default block vector will be used as a predictor. A flag is signalled to indicate the block vector predictor index.

2.5. Affine Motion Compensated Prediction

Figure 3B:
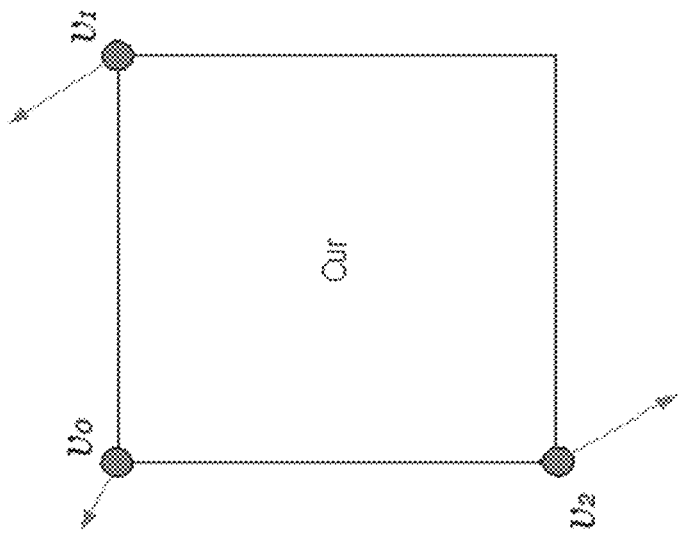
FIG. 3B shows a 6-parameter affine model example.
Figure 3A:
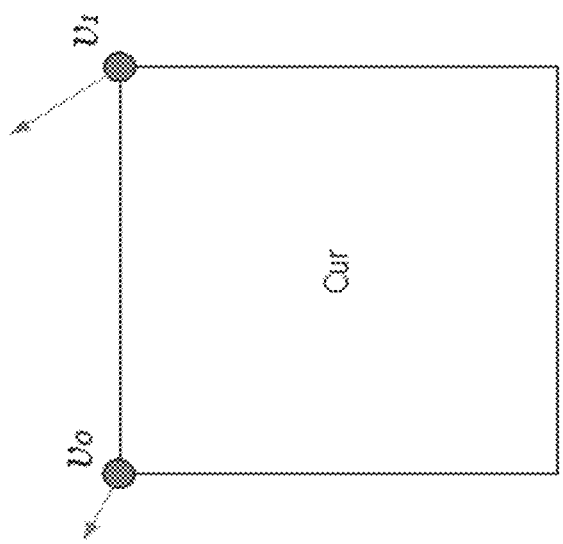
FIG. 3A shows a 4-parameter affine model example.

In HEVC, only a translation motion model is applied for motion compensation prediction (MCP). While in the real world, there are many kinds of motion, e.g., zoom in/out, rotation, perspective motions, and the other irregular motions. In VVC, a block-based affine transform motion compensation prediction is applied. As shown FIG. 3A-3B, the affine motion field of the block is described by motion information of two control point (4-parameter) or three control point motion vectors (6-parameter).

Figure 6:
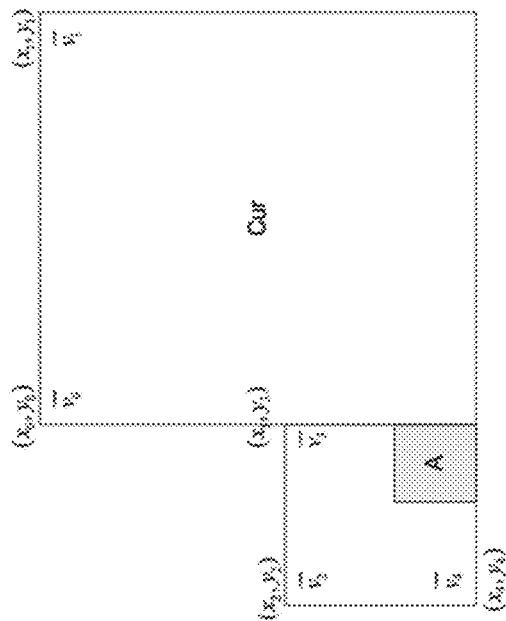
FIG. 6 illustrates an example of control point motion vector inheritance.

FIG. 6 illustrates an example of control point motion vector inheritance.

For 4-parameter affine motion model, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (2\text{-}1)$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2\text{-}2)$$

Where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 4:
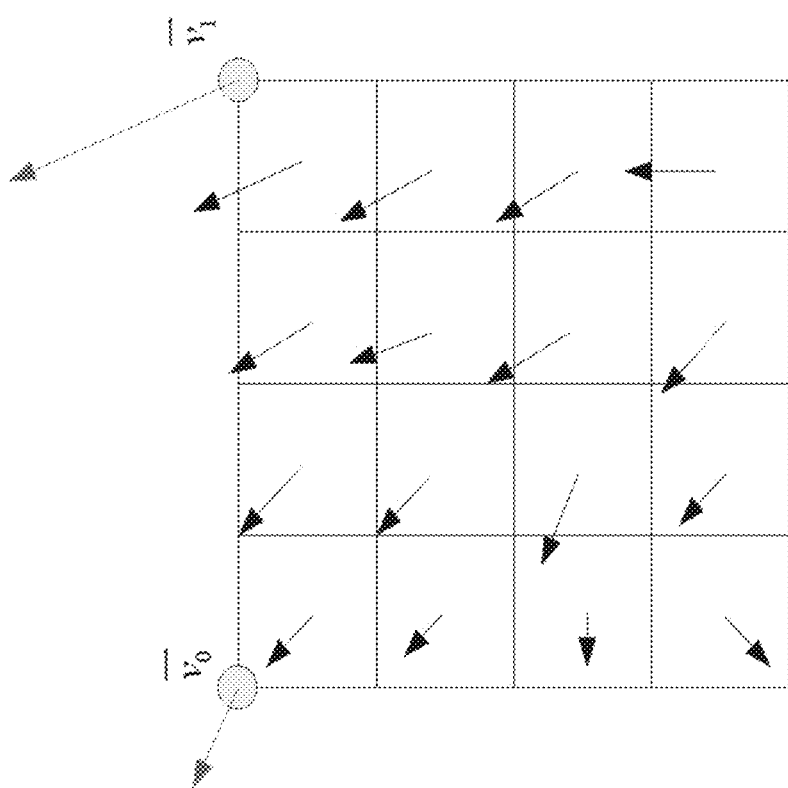
FIG. 4 shows an example of affine motion vector field (MVF) per subblock.

In order to simplify the motion compensation prediction, block based affine transform prediction is applied. To derive motion vector of each 4×4 luma subblock, the motion vector of the center sample of each subblock, as shown in FIG. 4, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the four corresponding 4×4 luma subblocks.

As done for translational motion inter prediction, there are also two affine motion inter prediction modes: affine merge mode and affine AMVP mode.

2.5.1. Affine Merge Prediction

Figure 5:
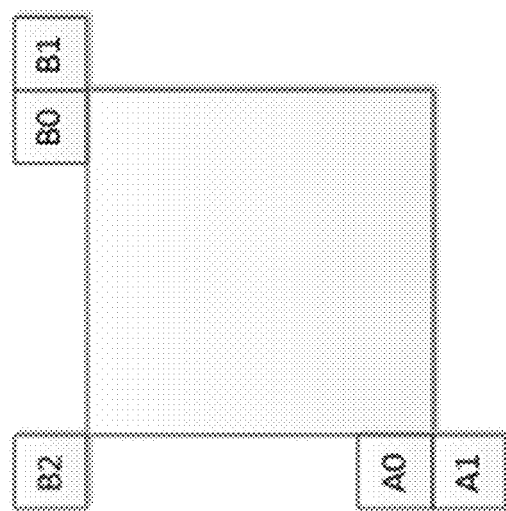
FIG. 5 shows example locations of inherited affine motion predictors.

AF_MERGE mode can be applied for CUs with both width and height larger than or equal to 8. In this mode, the control point motion vectors (CPMVs) of the current CU are generated based on the motion information of the spatial neighboring CUs. There can be up to five control point motion vector predictor (CPMVP) candidates and an index is signalled to indicate the one to be used for the current CU. The following three types of CPMV candidates are used to form the affine merge candidate list:
  Inherited affine merge candidates that are extrapolated from the CPMVs of the neighbour CUs
  Constructed affine merge candidates CPMVPs that are derived using the translational motion vectors (MVs) of the neighbour CUs
  Zero MVs In VVC, there are maximum two inherited affine candidates, which are derived from affine motion model of the neighboring blocks, one from left neighboring CUs and one from above neighboring CUs. The candidate blocks are shown in FIG. 5. For the left predictor, the scan order is A0->A1, and for the above predictor, the scan order is B0->B1->B2. Only the first inherited candidate from each side is selected. No pruning check is performed between two inherited candidates. When a neighboring affine CU is identified, its control point motion vectors are used to derive the CPMVP candidate in the affine merge list of the current CU. As shown in FIG. 5, if the neighbour left bottom block A is coded in affine mode, the motion vectors $v_2$, $v_3$, and $v_4$ of the top left corner, above right corner, and left bottom corner of the CU which contains the block A are attained. When block A is coded with 4-parameter affine model, the two CPMVs of the current CU are calculated according to $v_2$ and $v_3$. In case that block A is coded with 6-parameter affine model, the three CPMVs of the current CU are calculated according to $v_2$, $v_3$, and $v_4$.

Constructed affine candidate means the candidate is constructed by combining the neighbor translational motion information of each control point. The motion information for the control points is derived from the specified spatial neighbors and temporal neighbor shown in FIG. 7. $CPMV_k$ (k=1, 2, 3, 4) represents the k-th control point. For $CPMV_1$, the B2->B3->A2 blocks are checked and the MV of the first available block is used. For $CPMV_2$, the B1->B0 blocks are checked and for $CPMV_3$, the A1->A0 blocks are checked. For temporal motion vector prediction (TMVP), $CPMV_4$ is used if it's available.

After MVs of four control points are attained, affine merge candidates are constructed based on that motion information. The following combinations of control point MVs are used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.5.2. Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:
  Inherited affine AMVP candidates that extrapolated from the CPMVs of the neighbour CUs
  Constructed affine AMVP candidates CPMVPs that are derived using the translational MVs of the neighbour CUs
  Translational MVs from neighboring CUs
  Zero MVs
The checking order of inherited affine AMVP candidates is the same as the checking order of inherited affine merge candidates. The only difference is that, for AVMP candidate, only the affine CU that has the same reference picture as in the current block is considered. No pruning process is applied when inserting an inherited affine motion predictor into the candidate list.

Figure 7:
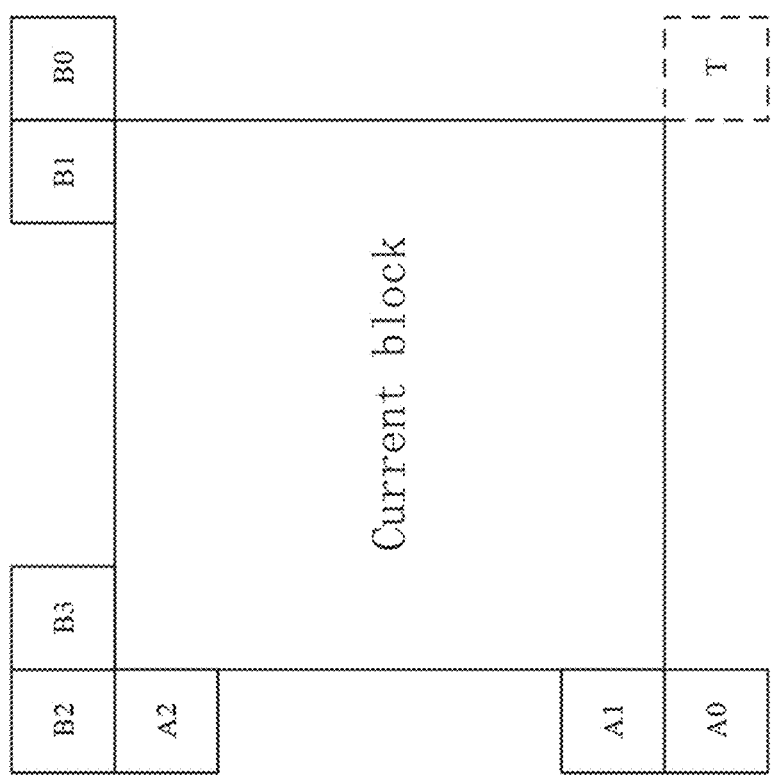
FIG. 7 shows example locations of candidate positions for constructed affine merge mode.

Constructed AMVP candidate is derived from the specified spatial neighbors shown in FIG. 7. The same checking order is used as done in affine merge candidate construction. In addition, reference picture index of the neighboring block is also checked. The first block in the checking order that is inter coded and has the same reference picture as in current CUs is used. There is only one when the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates are still less than 2 after inherited affine AMVP candidates and constructed AMVP candidate are checked, $mv_0$, $mv_1$, and $mv_2$ will be added, in order, as the translational MVs to predict all control point MVs of the current CU, when available. Finally, zero MVs are used to fill the affine AMVP list if it is still not full.

2.5.3. Affine Motion Information Storage

In VVC, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion compensation, MV derivation of merge/AMVP list of translational MVs and de-blocking.

Figure 8:
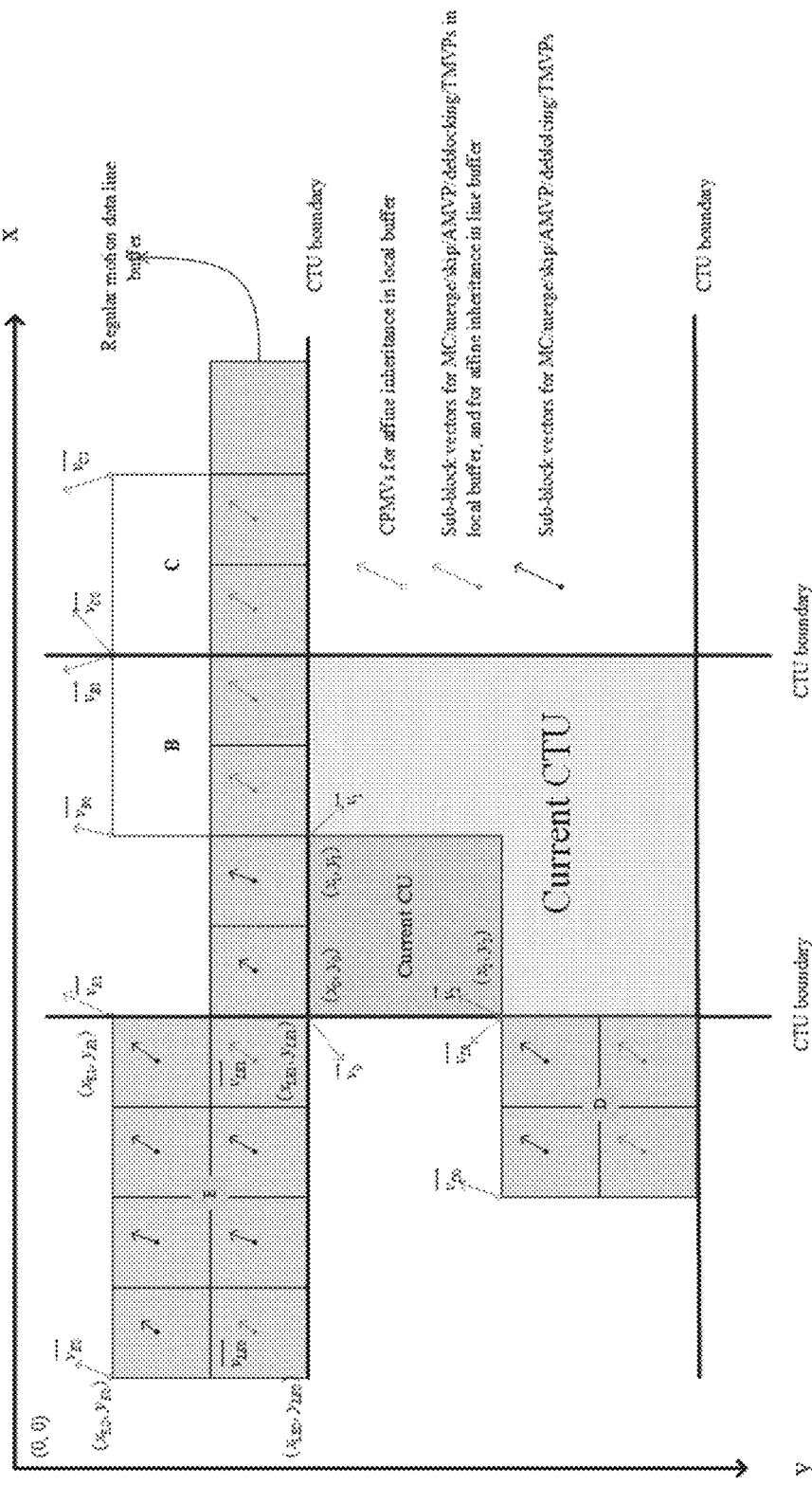
FIG. 8 is an illustration of motion vector usage for proposed combined method.

To avoid the picture line buffer for the additional CPMVs, affine motion data inheritance from the CUs from above CTU is treated differently to the inheritance from the normal neighboring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in local buffer. If the candidate CU is 6-parameter affine coded, the affine model is degraded to 4-parameter model. As shown in FIG. 8, along the top CTU boundary, the bottom-left and bottom right subblock motion vectors of a CU are used for affine inheritance of the CUs in bottom CTUs.

2.5.4. Prediction Refinement with Optical Flow for Affine Mode

Subblock based affine motion compensation can save memory access bandwidth and reduce computation complexity compared to pixel-based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, a luma prediction sample is refined by adding a difference derived by the optical flow equation. The PROF is described as following four steps:
Step 1) The subblock-based affine motion compensation is performed to generate subblock prediction I(i, j).
Step 2) The spatial gradients $g_x(i, j)$ and $g_y(i, j)$ of the subblock prediction are calculated at each sample location using a 3-tap filter [−1, 0, 1]. The gradient calculation is exactly the same as gradient calculation in BDOF.

$$g_x(i,j)=(I(i+1,j)>>shift1)-(I(i-1,j)>>shift1) \quad (2\text{-}3)$$

$$g_y(i,j)=(I(i,j+1)>>shift1)-(I(i,j-1)>>shift1) \quad (2\text{-}4)$$

shift1 is used to control the gradient's precision. The subblock (e.g. 4×4) prediction is extended by one sample on each side for the gradient calculation. To avoid additional memory bandwidth and additional interpolation computation, those extended samples on the extended borders are copied from the nearest integer pixel position in the reference picture.

Figure 9:
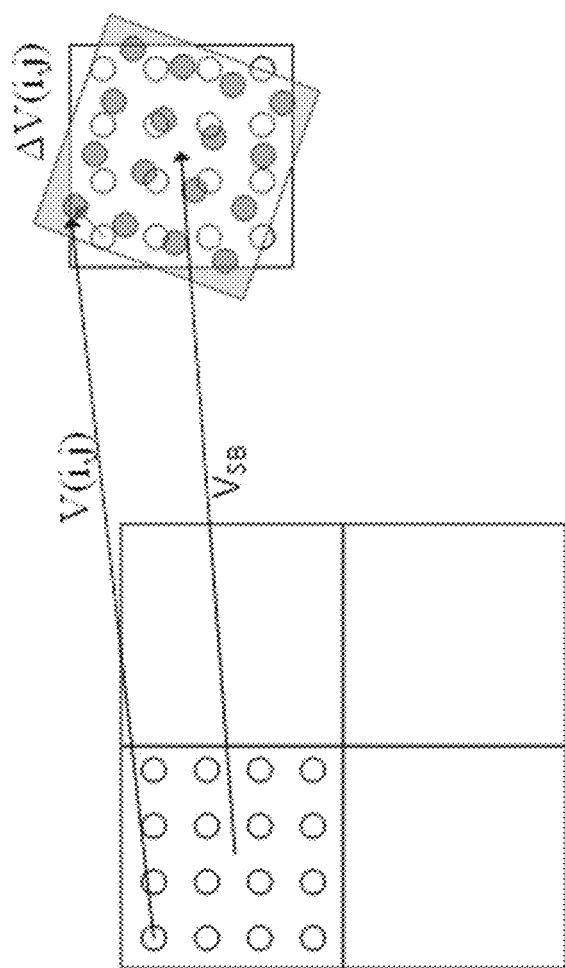
FIG. 9 shows an example of subblock MV $V_{SB}$ and pixel $\Delta v(i, j)$.

Step 3) The luma prediction refinement is calculated by the following optical flow equation.

$$\Delta I(i,j)=g_x(i,j)*\Delta v_x(i,j)+g_y(i,j)*\Delta v_y(i,j) \quad (2\text{-}5)$$

where the $\Delta v(i, j)$ is the difference between sample MV computed for sample location (i, j), denoted by $v(i, j)$, and the subblock MV of the subblock to which sample (i, j) belongs, as shown in FIG. 9. The $\Delta v(i, j)$ is quantized in the unit of 1/32 luam sample precision.

Since the affine model parameters and the sample location relative to the subblock center are not changed from subblock to subblock, $\Delta v(i, j)$ can be calculated for the first subblock, and reused for other subblocks in the same CU. Let dx(i, j) and dy(i, j) be the horizontal and vertical offset from the sample location (i, j) to the center of the subblock $(x_{SB}, y_{SB})$, $\Delta v(x, y)$ can be derived by the following equation, $$\begin{cases} dx(i,j) = i - x_{SB} \\ dy(i,j) = j - y_{SB} \end{cases} \quad (3\text{-}6)$$

$$\begin{cases} \Delta v_x(i,j) = C*dx(i,j) + D*dy(i,j) \\ \Delta v_y(i,j) = E*dx(i,j) + F*dy(i,j) \end{cases} \quad (3\text{-}7)$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \dfrac{v_{1x} - v_{0x}}{w} \\ E = -D = \dfrac{v_{1y} - v_{0y}}{w} \end{cases} \quad (3\text{-}8)$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad (3\text{-}9)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement $\Delta I(i, j)$ is added to the subblock prediction $I(i, j)$. The final prediction I' is generated as the following equation.

$$I'(i,j)=I(i,j)+\Delta I(i,j) \quad (3\text{-}10)$$

PROF is not applied in two cases for an affine coded CU: 1) when all control point MVs are the same, which indicates the CU only has translational motion; 2) when the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at the affine motion estimation stage in the following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

2.6. Example Availability Processes of Block Partitioning 6.4.1 Allowed Quad Split Process Inputs to this process are:
  a coding block size cbSize in luma samples,
  a multi-type tree depth mttDepth,
  a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
  a variable modeType specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.

Output of this process is the variable allowSplitQt.

The variable allowSplitQt is derived as follows:
  If one or more of the following conditions are true, allowSplitQt is set equal to FALSE:
    treeType is equal to SINGLE_TREE or DUAL_TREE_LUMA and cbSize is less than or equal to MinQtSizeY
    treeType is equal to DUAL_TREE_CHROMA and cbSize is less than or equal to (MinQtSizeC*SubHeightC/SubWidthC)
    mttDepth is not equal to 0
    treeType is equal to DUAL_TREE_CHROMA and (cbSize/SubWidthC) is less than or equal to 4
    treeType is equal to DUAL_TREE_CHROMA and modeType is equal to MODE_TYPE_INTRA
  Otherwise, allowSplitQt is set equal to TRUE.

6.4.2 Allowed Binary Split Process

Inputs to this process are:
  a binary split mode btSplit,
  a coding block width cbWidth in luma samples,
  a coding block height cbHeight in luma samples,
  a location (x0, y0) of the top-left luma sample of the considered coding block relative to the top-left luma sample of the picture,
  a multi-type tree depth mttDepth,
  a maximum multi-type tree depth with offset maxMttDepth, a maximum binary tree size maxBtSize,
a minimum quadtree size minQtSize,
a partition index partIdx,
a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
a variable modeType specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.

Output of this process is the variable allowBtSplit.

TABLE 2-1

Specification of parallelTtSplit and cbSize based on btSplit

| | btSplit == SPLIT_BT_VER | btSplit == SPLIT_BT_HOR |
|---|---|---|
| parallelTtSplit | SPLIT_TT_VER | SPLIT_TT_HOR |
| cbSize | cbWidth | cbHeight |

The variables parallelTtSplit and cbSize are derived as specified in Table 2-1.
The variable allowBtSplit is derived as follows:
  If one or more of the following conditions are true, allowBtSplit is set equal to FALSE:
    cbSize is less than or equal to MinBtSizeY
    cbWidth is greater than maxBtSize
    cbHeight is greater than maxBtSize
    mttDepth is greater than or equal to maxMttDepth
    treeType is equal to DUAL_TREE_CHROMA and (cbWidth/SubWidthC)*(cbHeight/SubHeightC) is less than or equal to 16
    treeType is equal to DUAL_TREE_CHROMA and (cbWidth/SubWidthC) is equal to 4 and btSplit is equal to SPLIT_BT_VER
    treeType is equal to DUAL_TREE_CHROMA and modeType is equal to MODE_TYPE_INTRA
    cbWidth*cbHeight is equal to 32 and modeType is equal to MODE_TYPE_INTER
  Otherwise, if all of the following conditions are true, allowBtSplit is set equal to FALSE
    btSplit is equal to SPLIT_BT_VER
    y0+cbHeight is greater than pic height in luma samples
  Otherwise, if all of the following conditions are true, allowBtSplit is set equal to FALSE
    btSplit is equal to SPLIT_BT_VER
    cbHeight is greater than 64
    x0+cbWidth is greater than pic width in luma samples
  Otherwise, if all of the following conditions are true, allowBtSplit is set equal to FALSE
    btSplit is equal to SPLIT_BT_HOR
    cbWidth is greater than 64
    y0+cbHeight is greater than pic height in luma samples
  Otherwise, if all of the following conditions are true, allowBtSplit is set equal to FALSE
    x0+cbWidth is greater than pic width in luma samples
    y0+cbHeight is greater than pic height in luma samples
    cbWidth is greater than minQtSize
  Otherwise, if all of the following conditions are true, allowBtSplit is set equal to FALSE
    btSplit is equal to SPLIT_BT_HOR
    x0+cbWidth is greater than pic width in luma samples
    y0+cbHeight is less than or equal to pic height in luma samples
  Otherwise, if all of the following conditions are true, allowBtSplit is set equal to FALSE:
    mttDepth is greater than 0
    partIdx is equal to 1
    MttSplitMode[x0][y0][mttDepth−1] is equal to parallelTtSplit
  Otherwise, if all of the following conditions are true, allowBtSplit is set equal to FALSE
    btSplit is equal to SPLIT_BT_VER
    cbWidth is less than or equal to 64
    cbHeight is greater than 64
  Otherwise, if all of the following conditions are true, allowBtSplit is set equal to FALSE
    btSplit is equal to SPLIT_BT_HOR
    cbWidth is greater than 64
    cbHeight is less than or equal to 64
  Otherwise, allowBtSplit is set equal to TRUE.

6.4.3 Allowed Ternary Split Process
Inputs to this process are:
  a ternary split mode ttSplit,
  a coding block width cbWidth in luma samples,
  a coding block height cbHeight in luma samples,
  a location (x0, y0) of the top-left luma sample of the considered coding block relative to the top-left luma sample of the picture,
  a multi-type tree depth mttDepth
  a maximum multi-type tree depth with offset maxMttDepth,
  a maximum ternary tree size maxTtSize,
  a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
  a variable modeType specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.

Output of this process is the variable allowTtSplit.

TABLE 2-2

Specification of cbSize based on ttSplit

| | ttSplit == SPLIT_TT_VER | ttSplit == SPLIT_TT_HOR |
|---|---|---|
| cbSize | cbWidth | cbHeight |

The variable cbSize is derived as specified in Table 2-2.
The variable allowTtSplit is derived as follows:
  If one or more of the following conditions are true, allowTtSplit is set equal to FALSE:
    cbSize is less than or equal to 2*MinTtSizeY
    cbWidth is greater than Min(64, maxTtSize)
    cbHeight is greater than Min(64, maxTtSize)
    mttDepth is greater than or equal to maxMttDepth
    x0+cbWidth is greater than pic width in luma samples
    y0+cbHeight is greater than pic height in luma samples treeType is equal to DUAL_TREE_CHROMA and (cbWidth/SubWidthC)*(cbHeight/SubHeightC) is less than or equal to 32 treeType is equal to DUAL_TREE_CHROMA and (cbWidth/SubWidthC) is equal to 8 and ttSplit is equal to SPLIT_TT_VER treeType is equal to DUAL_TREE_CHROMA and modeType is equal to MODE_TYPE_INTRA cbWidth*cbHeight is equal to 64 and modeType is equal to MODE_TYPE_INTER Otherwise, allowTtSplit is set equal to TRUE.

6.4.4 Derivation Process for Neighbouring Block Availability

Inputs to this process are:
 the luma location (xCurr, yCurr) of the top-left sample of the current block relative to the top-left luma sample of the current picture,
 the luma location (xNbY, yNbY) covered by a neighbouring block relative to the top-left luma sample of the current picture,
 the variable checkPredModeY specifying whether availability depends on the prediction mode,
 the variable cIdx specifying the colour component of the current block.

Output of this process is the availability of the neighbouring block covering the location (xNbY, yNbY), denoted as availableN.

The neighbouring block availability availableN is derived as follows:
 If one or more of the following conditions are true, availableN is set equal to FALSE:
  xNbY is less than 0
  yNbY is less than 0
  xNbY is greater than or equal to pic width in luma samples.
  yNbY is greater than or equal to pic height in luma samples.
  IsAvailable[cIdx][xNbY][yNbY] is equal to FALSE.
  The neighbouring block is contained in a different slice than the current block.
  The neighbouring block is contained in a different tile than the current block.
  sps_entropy_coding_sync_enabled_flag is equal to 1 and (xNbY>>CtbLog2SizeY) is greater than or equal to (xCurr>>CtbLog2SizeY)+1.
 Otherwise, availableN is set equal to TRUE.

When all of the following conditions are true, availableN is set equal to FALSE:
 checkPredModeY is equal to TRUE.
 availableN is set equal to TRUE.
  CuPredMode[0][xNbY][yNbY] is not equal to CuPredMode[0][xCurr][yCurr].

2.7. Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precisions. Dependent on the mode (normal AMVP mode or affine AVMP or IBC mode) for the current CU, the MVDs of the current CU can be adaptively selected as follows:

Normal AMVP mode: ¼ luma-sample, ½ luma-sample, 1 luma-sample or 4 luma-sample.
 Affine AMVP mode: ¼ luma-sample, 1 luma-sample or 1/16 luma-sample.
 IBC mode: 1 luma-sample or ¼ luma-sample.

The CU-level MVD resolution indication is conditionally signalled if the current CU has at least one non-zero MVD component. If all MVD components (that is, both horizontal and vertical MVDs for reference list L0 and reference list L1) are zero, ¼ luma-sample MVD resolution is inferred.

For a CU coded with normal AMVP inter mode (non-IBC, non-affine) that has at least one non-zero MVD component, a first flag (e.g., amvr_flag) is signalled to indicate whether ¼ luma-sample MVD precision is used for the CU. If the first flag is 0, no further signaling is needed and ¼ luma-sample MVD precision is used for the current CU. Otherwise, a second flag (e.g., $1^{st}$ bin of amvr_precision_idx) is signalled to indicate ½ luma-sample or other MVD precisions (1 luma-sample or 4 luma-sample) is used for normal AMVP CU. In the case of ½ luma-sample, a 6-tap interpolation filter instead of the default 8-tap interpolation filter is used for the ½ luma-sample position. Otherwise, a third flag (e.g., $2^{nd}$ bin of amvr_precision_idx) is signalled to indicate whether 1 luma-sample or 4 luma-sample MVD precision is used for normal AMVP CU.

For a CU coded with affine AMVP mode, the second flag is used to indicate whether 1 luma-sample or 1/16 luma-sample MVD precision is used.

For a CU coded with IBC mode, the first flag is not signalled and inferred to be equal to 1.

In current design of AMVR, amvr_flag equal to 0 specifies that the resolution of the motion vector difference is ¼ of a luma sample. amvr_flag equal to 1 specifies that the resolution of the motion vector difference is further specified by amvr_precision_idx.

amvr_precision_idx specifies that the resolution of the motion vector difference with AmvrShift is defined in Table 2-3.

Example Syntax Tables for AMVR 7.3.10.5 Coding Unit Syntax

| coding_unit( x0, y0, cbWidth, cbHeight, cqtDepth, treeType, modeType ) { | Descriptor |
|---|---|
| chType = treeType = = DUAL_TREE_CHROMA ? 1 : 0 | |
| if( slice_type != I \| \| sps_ibc_enabled_flag ) { | |
|  if( treeType != DUAL_TREE_CHROMA && | |
|   ( ( !( cbWidth = = 4 && cbHeight = = 4 ) && | |
|   modeType != MODE_TYPE_INTRA) \| \| | |
|   ( sps_ibc_enabled_flag && cbWidth <= 64 && cbHeight <= 64 ) ) ) | |
|   cu_skip_flag[ x0 ][ y0 ] | ae(v) |
|  if( cu_skip_flag [ x0 ][ y0 ] = = 0 && slice_type != I && | |
|   !( cbWidth = = 4 && cbHeight = = 4 ) && modeType = = MODE_TYPE_ALL ) | |

| coding_unit( x0, y0, cbWidth, cbHeight, cqtDepth, treeType, modeType ) { | Descriptor |
|---|---|
|     pred_mode_flag | ae(v) |
|     if( ( ( slice_type = = I && cu_skip_flag[ x0 ][ y0 ] = =0 ) \| \| | |
|         ( slice_type != I && ( CuPredMode[ chType ][ x0 ][ y0 ] != | |
| MODE_INTRA \| \| | |
|         ( ( ( cbWidth = = 4 && cbHeight = = 4 ) modeType = = | |
| MODE_TYPE_INTRA ) | |
|         && cu_skip_flag[ x0 ][ y0 ] = = 0 ) ) ) ) && | |
|         cbWidth <= 64 && cbHeight <= 64 && modeType != | |
| MODE_TYPE_INTER && | |
|         sps_ibc_enabled_flag && treeType != DUAL_TREE_CHROMA | |
| ) | |
|     pred_mode_ibc_flag | ae(v) |
|   } | |
|   if( CuPredMode[ chType ][ x0 ][ y0 ] = = MODE_INTRA && sps_palette_enabled_flag && | |
|     cbWidth <= 64 && cbHeight <= 64 && cu_skip_flag[ x0 ][ y0 ] = = 0 && | |
|     modeType != MODE_TYPE_INTER && ( ( cbWidth * cbHeight) > | |
|     ( treeType != DUAL_TREE_CHROMA ? 16 : 16 * SubWidthC * | |
| SubHeightC ) ) ) | |
|     pred_mode_plt_flag | ae(v) |
|   if( CuPredMode[ chType ][ x0 ][ y0 ] = = MODE_INTRA && sps_act_enabled_flag && | |
|     treeType = = SINGLE_TREE ) | |
|     cu_act_enabled_flag | ae(v) |
|   if( CuPredMode[ chType ][ x0 ][ y0 ] = = MODE_INTRA \| \| | |
|     CuPredMode[ chType ][ x0 ][ y0 ] = = MODE_PLT ) { | |
| . . . | |
|   } else if( treeType != DUAL_TREE_CHROMA ) {/* MODE_INTER or MODE_IBC */ | |
|     if( cu_skip_flag [ x0 ][ y0 ] = = 0 ) | |
|       general_merge_flag[ x0 ][ y0 ] | ae(v) |
|     if( general_merge_flag[ x0 ][ y0 ] ) | |
|       merge_data( x0, y0, cbWidth, cbHeight, chType ) | |
|     else if( CuPredMode[ chType ][ x0 ][ y0 ] = = MODE_IBC ) { | |
|       mvd_coding( x0, y0, 0, 0 ) | |
|       if( MaxNumIbcMergeCand > 1 ) | |
|         mvp_l0_flag[ x0 ][ y0 ] | ae(v) |
|       if(sps_amvr_enabled_flag && | |
|         (MvdL0[ x0 ][ y0 ][ 0 ] != 0 \| \| | |
| MvdL0[ x0 ][ y0 ][ 1 ] != 0 ) ) | |
|         *amvr_precision_idx* [ x0 ][ y0 ] | ae(v) |
|     } else { | |
|       if( slice_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( sps_smvd_enabled_flag && !mvd_l1_zero_flag && | |
|         inter_pred_idc[ x0 ][ y0 ] = = PRED_BI && | |
|         !inter_affine_flag[ x0 ][ y0 ] && RefIdxSymL0 > −1 && | |
| RefIdxSymL1 > −1 ) | |
|         sym_mvd_flag[ x0 ][ y0 ] | ae(v) |
|       if( inter_pred_idc[ x0 ][ y0 ] != PRED_L1 ) { | |
|         if( NumRefIdxActive[ 0 ] > 1 && !sym_mvd_flag[ x0 ][ y0 ] ) | |
|           ref_idx_l0[ x0 ][ y0 ] | ae(v) |
|         mvd_coding( x0, y0, 0, 0 ) | |
|         if( MotionModelIdc[ x0 ][ y0 ] > 0 ) | |
|           mvd_coding( x0, y0, 0, 1) | |
|         if(MotionModelIdc[ x0 ][ y0 ] > 1 ) | |
|           mvd_coding( x0, y0, 0, 2 ) | |
|         mvp_l0 flag [ x0 ][ y0 ] | ae(v) |
|       } else { | |
|         MvdL0[ x0 ][ y0 ][ 0 ] = 0 | |
|         MvdL0[ x0 ][ y0 ][ 1 ] = 0 | |
|       } | |
|       if( inter_pred_idc[ x0 ][ y0 ] != PRED_L0 ) { | |
|         if( NumRefIdxActive[ 1 ] > 1 && !sym_mvd_flag[ x0 ][ y0 ] ) | |
|           ref_idx_l1[ x0 ][ y0 ] | ae(v) |
|         if( mvd_l1_zero_flag && inter_pred_idc [ x0 ][ y0 ] = = PRED_B1 ) { | |
|           MvdL1[ x0 ][ y0 ][ 0 ] = 0 | |
|           MvdL1[ x0 ][ y0 ][ 1 ] = 0 | |
|           MvdCpL1[ x0 ][ y0 ][ 0 ][ 0 ] = 0 | |
|           MvdCpL1[ x0 ][ y0 ][ 0 ][ 1 ] = 0 | |
|           MvdCpL1[ x0 ][ y0 ][ 1 ][ 0 ] = 0 | |

-continued

| coding_unit( x0, y0, cbWidth, cbHeight, cqtDepth, treeType, modeType ) { | Descriptor |
|---|---|
|         MvdCpL1[ x0 ][ y0 ][ 1 ][ 1 ] = 0 | |
|         MvdCpL1[ x0 ][ y0 ][ 2 ][ 0 ] = 0 | |
|         MvdCpL1[ x0 ][ y0 ][ 2 ][ 1 ] = 0 | |
|       } else { | |
|         if sym_mvd_flag[ x0 ][ y0 ] ) { | |
|           MvdL1[ x0 ][ y0 ][ 0 ] = −MvdL0[ x0 ][ y0 ][ 0 ] | |
|           MvdL1[ x0 ][ y0 ][ 1 ] = −MvdL0[x0][y0][ 1 ] | |
|         } else | |
|           mvd_coding( x0, y0, 1, 0 ) | |
|         if( MotionModelIdc[ x0 ][ y0 ] > 0 ) | |
|           mvd_coding( x0, y0, 1, 1 ) | |
|         if(MotionModelIdc[ x0 ][ y0 ] > 1 ) | |
|           mvd_coding( x0, y0, 1, 2 ) | |
|       } | |
|       mvp_l1_flag[ x0 ][ y0 ] | ae(v) |
|     } else { | |
|       MvdL1[ x0 ][ y0 ][ 0 ] = 0 | |
|       MvdL1[ x0 ][ y0 ][ 1 ] = 0 | |
|     } | |
|     if( (sps_amvr_enabled_flag && inter_affine_flag[ x0 ][ y0 ] = = 0 && | |
|       ( MvdL0[ x0 ][ y0 ][ 0 ] != 0 \|\| MvdL0[ x0 ][ y0 ][ 1 ] != 0 \|\| | |
|       MvdL1[ x0 ][ y0 ][ 0 ] != 0 \|\| MvdL1[ x0 ][ y0 ][ 1 ] != 0 ) ) \|\| | |
|       ( sps_affine_amvr_enabled_flag && inter_affine_flag[ x0 ][ y0 ] = = 1 && | |
|       ( MvdCpL0[ x0 ][ y0 ][ 0 ][ 0 ] != 0 \|\| MvdCpL0[ x0 ][ y0 ][ 0 ][ 1 ] != 0 \|\| | |
|       MvdCpL1[ x0][ y0 ][ 0 ][ 0 ] != 0 \|\| MvdCpL1[ x0 ][ y0 ][ 0 ][ 1 ] != 0 \|\| | |
|       MvdCpL0[ x0 ][ y0 ][ 1 ][ 0 ] != 0 \|\| MvdCpL0[ x0 ][ y0 ][ 1 ][ 1 ] != 0 \|\| | |
|       MvdCpL1[ x0 ][ y0 ][ 1 ][ 0 ] != 0 \|\| MvdCpL1[ x0 ][ y0 ][ 1 ][ 1 ] != 0 \|\| | |
|       MvdCpL0[ x0 ][ y0 ][ 2 ][ 0 ] != 0 \|\| MvdCpL0[ x0 ][ y0 ][ 2 ][ 1 ] != 0 \|\| | |
|       MvdCpL1[ x0 ][ y0 ][ 2 ][ 0 ] != 0 \|\| MvdCpL1[ x0 ][ y0 ][ 2 ][ 1 ] != 0 ) ) { | |
|       amvr_flag [ x0 ][ y0 ] | ae(v) |
|       if( amvr_flag[ x0][ y0 ] ) | |
|         amvr_precision_idx [ x0 ][y0 ] | ae(v) |
|     } | |
|     if( sps_bcw_enabled_flag && inter_pred_idc[ x0 ][ y0 ] = = PRED_BI && | |
|       luma_weight_l0_flag[ ref_idx_l0 [ x0 ][ y0 ] ] = = 0 && | |
|       luma_weight_l1_flag[ ref_idx_l1 [ x0 ][ y0 ] ] = = 0 && | |
|       chroma_weight_l0_flag[ ref_idx_l0[ x0 ][ y0 ] ] = = 0 && | |
|       chroma_weight_l1_flag[ ref_idx_l1[ x0 ][ y0 ] ] = = 0 && | |
|       cbWidth * cbHeight >= 256 ) | |
|       bcw_idx[ x0 ][ y0 ] | ae(v) |
|   } | |
| } | |
| ... | |

To be more specific, the bin string and context used for coding the bin string for amvr_flag and amvr_precision_idx are defined as follows:

| | amvr_flag | semantics |
|---|---|---|
| IBC | — | |
| Affine AMVR | 0/1 | 0: ¼ luma-sample |
| | | 1: 1/16 luma-sample or 1 luma-sample |
| Normal inter (non-IBC, non-affine) | 0/1 | 0: ¼ luma-sample |
| | | 1: ½ luma-sample, or 1 luma-sample or 4 luma-sample |
| Bin Index | 0 | |

| Value of amvr_precision_idx for IBC | Bin string of amvr_precision_idx | semantics |
|---|---|---|
| 0 | 0 | 1 luma-sample |
| 1 | 1 | 4 luma-sample |
| 2 | | |
| Bin Index | 0 (context A) | |

| Value of amvr_precision_idx for Affine AMVR | Bin string of amvr_precision_idx | semantics |
|---|---|---|
| 0 | 0 | 1/16 luma-sample |
| 1 | 1 | 1 luma-sample |
| 2 | | |
| Bin Index | 0 (context A) | |

| Value of amvr_precision_idx for Normal inter (non-IBC, non-affine) | Bin string of amvr_precision_idx | | semantics |
|---|---|---|---|
| 0 | 0 | | 1/2 luma-sample |
| 1 | 1 | 0 | 1 luma-sample |
| 2 | 1 | 1 | 4 luma-sample |
| Bin Index | 0 (context A) | 1 (contextB) | |

7.4.11.5 Coding Unit Semantics amvr_precision_idx[x0][y0] specifies that the resolution of the motion vector difference with AmvrShift is defined in Table 2-3. The array indices x0, y0 specify the location (x0, y0) of the top-left luma sample of the considered coding block relative to the top-left luma sample of the picture. When amvr_precision_idx[x0][y0] is not present, it is inferred to be equal to 0.

TABLE 2-3

Specification of AmvrShift

| amvr_flag | amvr_precision_idx | AmvrShift inter_affine_flag == 1 | CuPredMode[ chType ][ x0 ][ y0 ] == MODE_IBC ) | inter_affine_flag == 0 && CuPredMode[ chType ][ x0 ][ y0 ] != MODE_IBC |
|---|---|---|---|---|
| 0 | — | 2 (1/4 luma sample) | — | 2 (1/4 luma sample) |
| 1 | 0 | 0 (1/16 luma sample) | 4 (1 luma sample) | 3 (1/2 luma sample) |
| 1 | 1 | 4 (1 luma sample) | 6 (4 luma samples) | 4 (1 luma sample) |
| 1 | 2 | — | — | 6 (4 luma samples) |

9.3.3 Binarization Process

TABLE 126

Syntax elements and associated binarizations

| Syntax structure | Syntax element | Binarization Process | Input parameters |
|---|---|---|---|
| coding_tree( ) | split_cu_flag | FL | cMax = 1 |
| | split_qt_flag | FL | cMax = 1 |
| | mtt_split_cu_vertical_flag | FL | cMax = 1 |
| | mtt_split_cu_binary_flag | FL | cMax = 1 |
| | mode_constraint_flag | FL | cMax = 1 |
| coding_unit( ) | cu_skip_flag[ ][ ] | FL | cMax = 1 |
| | pred_mode_ibc_flag | FL | cMax = 1 |
| | pred_mode_plt_flag | FL | cMax = 1 |
| | cu_act_enabled_flag | FL | cMax = 1 |
| | pred_mode_flag | FL | cMax = 1 |
| | intra_bdpcm_luma_flag | FL | cMax = 1 |
| | intra_bdpcm_luma_dir_flag | FL | cMax = 1 |
| | intra_mip_flag[ ][ ] | FL | cMax = 1 |
| | intra_mip_transposed_flag[ ][ ] | FL | cMax = 1 |
| | intra_mip_mode[ ][ ] | TB | cMax = (cbWidth == 4 && cbHeight == 4) ? 15 : ( ( (cbWith == 4 cbHeight == 4) | | (cbWith == 8 && cbHeight == 8) )? 7 : 5) |
| | intra_luma_ref_idx[ ][ ] | TR | cMax = 2, cRiceParam = 0 |
| | intra_subpartitions_mode_flag | FL | cMax = 1 |
| | intra_subpartitions_split_flag | FL | cMax = 1 |
| | intra_luma_mpm_flag[ ][ ] | FL | cMax = 1 |
| | intra_luma_not_planar_flag[ ][ ] | FL | cMax = 1 |
| | intra_luma_mpm_idx[ ][ ] | TR | cMax = 4, cRiceParam = 0 |
| | intra_luma_mpm_remainder[ ][ ] | TB | cMax = 60 |
| | intra_bdpcm_chroma_flag | FL | cMax = 1 |
| | intra_bdpcm_chroma_dir_flag | FL | cMax = 1 |
| | cclm_mode_flag | FL | cMax = 1 |
| | cclm_mode_idx | TR | cMax = 2, cRiceParam = 0 |
| | intra_chroma_pred_mode | 9.3.3.8 | — |
| | general_merge_flag[ ][ ] | FL | cMax = 1 |

TABLE 126-continued

Syntax elements and associated binarizations

| Syntax structure | Syntax element | Binarization Process | Input parameters |
|---|---|---|---|
| | inter_pred_idc[ x0 ][ y0 ] | 9.3.3.9 | cbWidth, cbHeight |
| | inter_affine_flag[ ][ ] | FL | cMax = 1 |
| | cu_affine_type_flag[ ][ ] | FL | cMax = 1 |
| | sym_mvd_flag[ ][ ] | FL | cMax = 1 |
| | ref_idx_l0[ ][ ] | TR | cMax = NumRefIdxActive[ 0 ] − 1, cRiceParam = 0 |
| | mvp_l0_flag[ ][ ] | FL | cMax = 1 |
| | ref_idx_l1[ ][ ] | TR | cMax = NumRefIdxActive[ 1 ] − 1, cRiceParam = 0 |
| | mvp_l1_flag[ ][ ] | FL | cMax = 1 |
| | amvr_flag[ ][ ] | FL | cMax = 1 |
| | amvr_precision_idx[ ][ ] | TR | cMax = (inter affine flag = = 0 && CuPredMode[ 0 ][ x0 ][ y0 ] != MODE_IBC ) ? 2 : 1, cRiceParam = 0 |

9.3.2.2 Initialization Process for Context Variables

TABLE 51

Association of ctxIdx and syntax elements for each initializationType in the initialization process

| Syntax structure | Syntax element | ctxTable | initType 0 | 1 | 2 |
|---|---|---|---|---|---|
| coding_unit( ) | amvr_flag[ ][ ] | Table 88 | | 0...1 | 2...3 |
| | amvr_precision_idx[ ][ ] | Table 89 | 0...1 | 2...3 | 4...5 |

TABLE 88

Specification of initValue and shiftIdx for ctxIdx of amvr_flag

| Initialization variable | ctxIdx of amvr_flag | | | |
|---|---|---|---|---|
| | 0 | 1 | 2 | 3 |
| initValue | EP | EP | EP | EP |
| shiftIdx | 0 | 0 | 0 | 0 |

TABLE 89

Specification of initValue and shiftIdx for ctxIdx of amvr_precision_idx

| Initialization variable | ctxIdx of amvr_precision_idx | | | | | |
|---|---|---|---|---|---|---|
| | 0 | 1 | 2 | 3 | 4 | 5 |
| initValue | EP | EP | EP | EP | EP | EP |
| shiftIdx | 0 | 0 | 0 | 0 | 0 | 0 |

9.3.4.2 Derivation Process for ctxTable, ctxIdx and bypassFlag 9.3.4.2.1 General

TABLE 131

Assignment of ctxInc to syntax elements with context coded bins

| Syntax element | binIdx | | | | | |
|---|---|---|---|---|---|---|
| | 0 | 1 | 2 | 3 | 4 | >=5 |
| amvr_flag[ ][ ] | inter_affine_flag[ ][ ] ? 1:0 | na | na | na | na | na |
| amvr_precision_idx[ ][ ] | 0 | 1 | na | na | na | na |

2.8. Splitting Information

Figure 10:
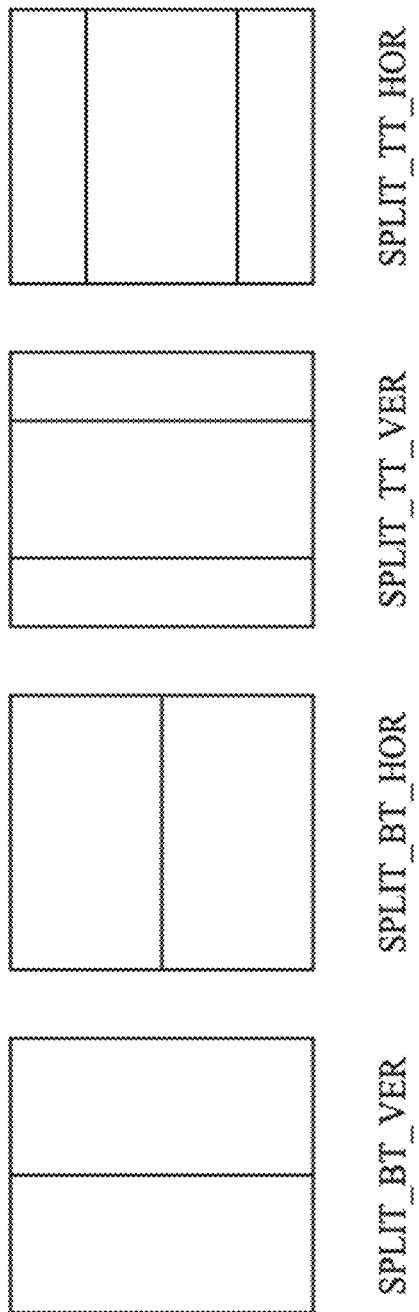
FIG. 10 shows an example of multi-type tree splitting modes.

In VVC, a quadtree with nested multi-type tree using binary and ternary splits segmentation structure replaces the concepts of multiple partition unit types, e.g. it removes the separation of the CU, PU and transform unit (TU) concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a., quadtree) structure. Then the quaternary tree leaf nodes can be further partitioned by a multi-type tree structure. As shown in FIG. 10, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 11:
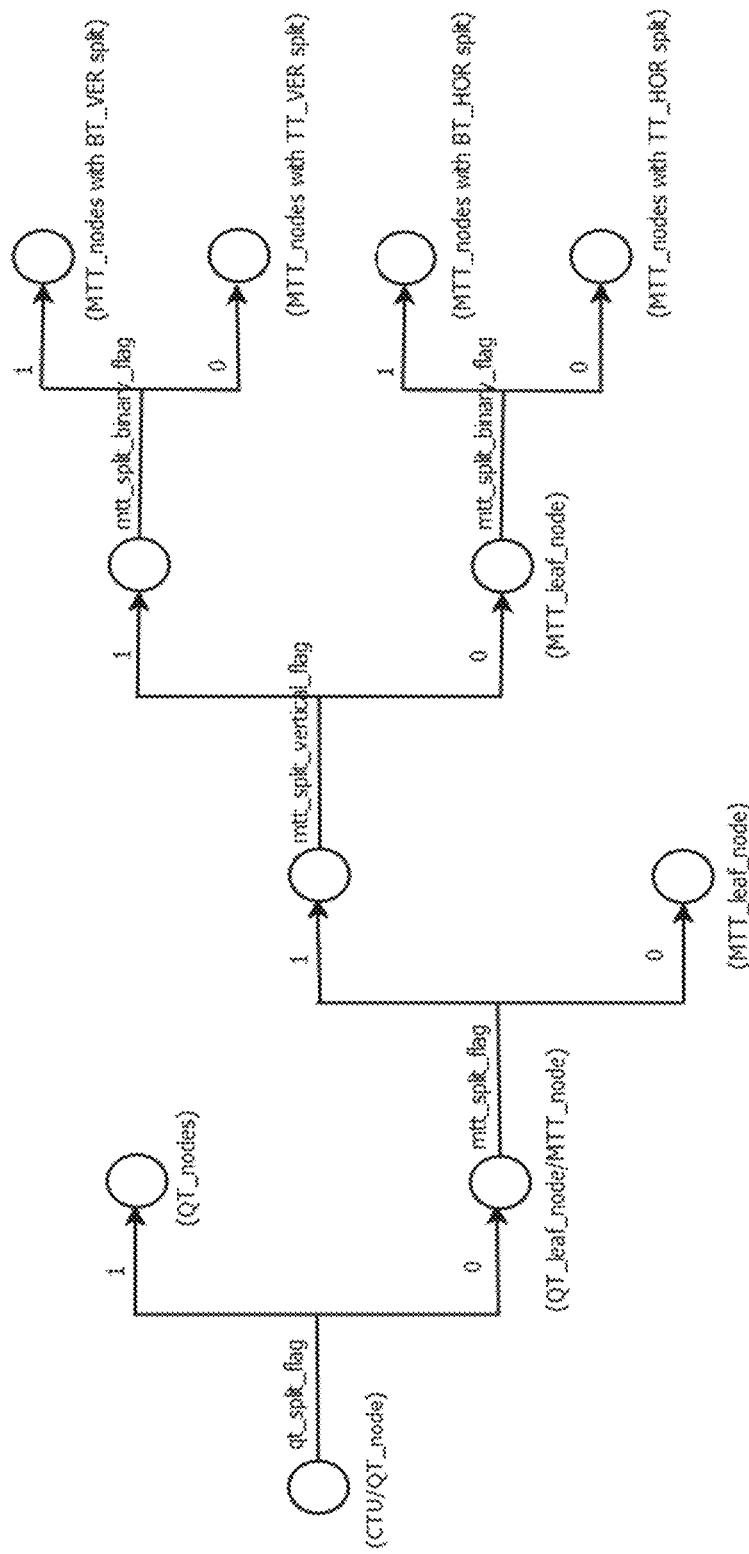
FIG. 11 shows an example of splitting flags signalling in quadtree with nested multi-type tree coding tree structure.

FIG. 11 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 2-4.

TABLE 2-4

MttSplitMode derviation based on multi-type tree syntax elements

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 | mtt_split_cu_vertical_flag equal to 0 specifies that a coding unit is split horizontally. mtt_split_cu_vertical_flag equal to 1 specifies that a coding unit is split vertically
When mtt_split_cu_vertical_flag is not present, it is inferred as follows:
  If allowSplitBtHor is equal to TRUE or allowSplitTtHor is equal to TRUE, the value of mtt_split_cu_vertical_flag is inferred to be equal to 0.
  Otherwise, the value of mtt_split_cu_vertical_flag is inferred to be equal to 1.
Example Syntax Tables for mtt_split_cu_vertical_flag
9.3.2.2 Initialization Process for Context Variables

TABLE 51

Association of ctxIdx and syntax elements for each initializationType in the initialization process

| | | | initType | | |
|---|---|---|---|---|---|
| Syntax structure | Syntax element | ctxTable | 0 | 1 | 2 |
| coding_tree( ) | mtt_split_cu_vertical_flag | Table 61 | 0 ... 4 | 5 ... 9 | 10 ... 14 |

TABLE 61

Specification of initValue and shiftIdx for ctxInc of mtt_split_cu_vertical_flag

| Initialization | ctxIdx of mtt_split_cu_vertical_flag | | | | | | | | | | | | | | |
|---|---|---|---|---|---|---|---|---|---|---|---|---|---|---|---|
| variable | 0 | 1 | 2 | 3 | 4 | 5 | 6 | 7 | 8 | 9 | 10 | 11 | 12 | 13 | 14 |
| initValue | EP | EP | EP | EP | EP | EP | EP | EP | EP | EP | EP | EP | EP | EP | EP |
| shiftIdx | 0 | 0 | 0 | 0 | 0 | 0 | 0 | 0 | 0 | 0 | 0 | 0 | 0 | 0 | 0 |

9.3.4.2 Derivation Process for ctxTable, ctxIdx and bypassFlag
9.3.4.2.1 General

TABLE 131

Assignment of ctxInc to syntax elements with context coded bins

| | binIdx | | | | | |
|---|---|---|---|---|---|---|
| Syntax element | 0 | 1 | 2 | 3 | 4 | >=5 |
| mtt_split_cu_vertical_flag | 0 ... 4 (clause 9.3.4.2.3) | na | na | na | na | na |

9.3.4.2.3 Derivation Process of ctxIncfor the Syntax Element mtt_split_cu_vertical_flag
Input to this process is the luma location (x0, y0) specifying the top-left luma sample of the current luma block relative to the top-left sample of the current picture, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics in clause 7.4.11.4.
Output of this process is ctxInc.
The location (xNbL, yNbL) is set equal to (x0-1, y0) and the derivation process for neighbouring block availability as specified in clause 6.4.4 is invoked with the location (xCurr, yCurr) set equal to (x0, y0) and the neighbouring location (xNbY, yNbY) set equal to (xNbL, yNbL), checkPredModeY set equal to FALSE, and cIdx as inputs, and the output is assigned to availableL.
The location (xNbA, yNbA) is set equal to (x0, y0-1) and the derivation process for neighbouring block availability as specified in clause 6.4.4 is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA.
The assignment of ctxInc is specified as follows:
  If allowSplitBtVer+allowSplitBtHor is greater than allowSplitTtVer+allowSplitTtHor, ctxInc is set equal to 4.
  Otherwise, if allowSplitBtVer+allowSplitBtHor is less than allowSplitTtVer+allowSplitTtHor, ctxInc is set equal to 4.
  Otherwise, the following applies:
    The variables dA and dL are derived as follows $$dA = cbWidth/(availableA?CbWidth[chType][xNbA][yNbA]:1) \quad (1563)$$

$$dL = cbHeight/(availableL?CbHeight[chType][xNbL][yNbL]:1) \quad (1564)$$

If any of the following conditions is true, ctxInc is set equal to 0:
      dA is equal to dL,
      availableA is equal to FALSE,
      availableL is equal to FALSE.
    Otherwise, if dA is less then dL, ctxInc is set equal to 1.
  Otherwise, ctxInc is set equal to 0.

2.9. Coefficients Coding in Transform Skip Mode

In the current VVC draft, several modifications are proposed on the coefficients coding in transform skip (TS) mode compared to the non-TS coefficient coding in order to adapt the residual coding to the statistics and signal characteristics of the transform skip levels.

7.3.10.11 Residual Coding Syntax

| residual_coding( x0, y0, log2TbWidth, log2TbHeight, cIdx ) { | Descriptor |
|---|---|
| if( sps_mts_enabled_flag && cu_sbt_flag && cIdx == 0 && | |
| log2TbWidth == 5 && log2TbHeight < 6 ) | |
| log2ZoTbWidth = 4 | |
| else | |
| log2ZoTbWidth = Min( log2TbWidth, 5 ) | |
| if( sps_mts_enabled_flag && cu_sbt_flag && cIdx == 0 && | |
| log2TbWidth < 6 && log2TbHeight == 5 ) | |
| log2ZoTbHeight = 4 | |
| else | |
| log2ZoTbHeight = Min( log2TbHeight, 5 ) | |
| if( log2TbWidth > 0 ) | |
| last_sig_coeff_x_prefix | ae(v) |
| if( log2TbHeight > 0 ) | |
| last_sig_coeff_y_ prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| log2Tb Width = log2ZoTb Width | |
| log2TbHeight = log2ZoTbHeight | |
| remBinsPass1 = ( ( 1 << ( log2TbWidth + log2TbHeight ) ) * 7 ) >> 2 | |
| log2SbW = ( Min( log2TbWidth, log2TbHeight ) < 2 ? 1 : 2 ) | |
| log2SbH = log2SbW | |
| if( log2TbWidth + log2TbHeight > 3 ) | |
| if( log2TbWidth < 2 ) { | |
| log2SbW = log2TbWidth | |
| log2SbH = 4 − log2SbW | |
| } else if( log2TbHeight < 2 ) { | |
| log2SbH = log2TbHeight | |
| log2SbW = 4 − log2SbH | |
| } | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| do { | |
| if( lastScanPos == 0 ) { | |
| lastScanPos = numSbCoeff | |
| lastSubBlock− − | |
| } | |
| lastScanPos− − | |
| xS = DiagScanOrder[ log2TbWidth − log2SbW ][ log2TbHeight − log2SbH ] | |
| [ lastSubBlock ][ 0 ] | |
| yS = DiagScanOrder[ log2TbWidth − log2SbW ][ log2TbHeight − log2SbH ] | |
| [ lastSubBlock ][ 1 ] | |
| xC = ( xS << log2SbW ) + DiagScanOrder[ log2SbW ][ log2SbH ][ lastScanPos ][ 0 ] | |
| yC = ( yS << log2SbH ) + DiagScanOrder[ log2SbW ][ log2SbH ][ lastScanPos ][ 1 ] | |
| } while( ( xC != LastSignificantCoeffX ) ( yC != LastSignificantCoeffY ) ) | |
| if( lastSubBlock == 0 && log2TbWidth >= 2 && log2TbHeight >= 2 && | |
| !transform_skip_flag[ x0 ][ y0 ][ cIdx ] && lastScanPos > 0 ) | |
| LfnstDcOnly = 0 | |
| if( ( lastSubBlock > 0 && log2TbWidth >= 2 && log2TbHeight >= 2 ) \|\| | |
| ( lastScanPos > 7 && ( log2Tb Width == 2 \|\| log2Tb Width == 3 ) ) && | |
| log2TbWidth == log2TbHeight ) ) | |
| LfnstZeroOutSigCoeffFlag = 0 | |
| if( ( lastSubBlock > 0 \|\| lastScanPos > 0 ) && cIdx == 0 ) | |
| MtsDcOnly = 0 | |
| QState = 0 | |
| for( i = lastSubBlock; i >= 0; i− − ) { | |
| startQStateSb = QState | |
| xS = DiagScanOrder[ log2TbWidth − log2SbW ][ log2TbHeight − log2SbH ] | |
| [ i ][ 0 ] | |
| yS = DiagScanOrder[ log2TbWidth − log2SbW ][ log2TbHeight − log2SbH ] | |
| [ i ][ 1 ] | |
| inferSbDcSigCoeffFlag = 0 | |
| if( i < lastSubBlock && i > 0 ) { | |
| sb_coded_flag[ xS ][ yS ] | ae(v) |
| inferSbDcSigCoeffFlag = 1 | |
| } |

```
if( sb_coded_flag[ xS ][ yS ] && ( xS > 3 | | yS > 3 ) && cIdx = = 0 )
    MtsZeroOutSigCoeffFlag = 0
firstSigScanPosSb = numSbCoeff
lastSigScanPosSb = −1
firstPosMode0 = ( i = = lastSubBlock ? lastScanPos : numSbCoeff − 1 )
firstPosMode1 = firstPosMode0
for( n = firstPosMode0; n >= 0 && remBinsPass1 >= 4; n− − ) {
    xC        =    (    xS    <<    log2SbW    )    +
DiagScanOrder[ log2SbW ][ log2SbH ][ n ][ 0 ]
    yC        =    (    yS    <<    log2SbH    )    +
DiagScanOrder[ log2SbW ][ log2SbH ][ n ][ 1 ]
    if( sb_coded_flag[ xS ][ yS ] && ( n > 0 !inferSbDcSigCoeffFlag )
&&
        ( xC != LastSignificantCoeffX | | yC != Last
SignificantCoeffY ) ) {
        sig_coeff_flag[ xC ][ yC ]                                    ae(v)
        remBinsPass1− −
        if( sig_coeff_flag[ xC ][ yC ] )
            inferSbDcSigCoeffFlag = 0
    }
    if( sig_coeff_flag[ xC ][ yC ] ) {
        abs_level_gtx_flag[ n ][ 0 ]                                  ae(v)
        remBinsPass1− −
        if( abs_level_gtx_flag[ n ][ 0 ] ) {
            par_level_flag[ n ]                                       ae(v)
            remBinsPass1− −
            abs_level_gtx_flag[ n ][ 1 ]                              ae(v)
            remBinsPass1− −
        }
        if( lastSigScanPosSb = = −1 )
            lastSigScanPosSb = n
        firstSigScanPosSb = n
    }
    AbsLevelPass1[ xC ][ yC ] = sig_coeff_flag[ xC ][ yC ] +
par_level_flag[ n ] +
        abs_level_gtx_flag[ n ][ 0 ] + 2 * abs_level_gtx_flag[ n ][ 1 ]
        if( ph_dep_quant_enabled_flag )
            QState       =
QStateTransTable[ QState ][ AbsLevelPass1[ xC ][ yC ] & 1 ]
        firstPosMode1 = n − 1
}
for( n = firstPosMode0; n > firstPosMode1; n− − ) {
    xC        =    (    xS    <<    log2SbW    )    +
DiagScanOrder[ log2SbW ][ log2SbH ][ n ][ 0 ]
    yC        =    (    yS    <<    log2SbH    )    +
DiagScanOrder[ log2SbW ][ log2SbH ][ n ][ 1 ]
    if( abs_level_gtx_flag[ n ][ 1 ] )
        abs_remainder[ n ]                                            ae(v)
    AbsLevel[ xC ][ yC ] = AbsLevelPass1[ xC ][ yC ]
+2 * abs_remainder[ n ]
}
for( n = firstPosMode1; n >= 0; n− − ) {
    xC        =    (    xS    <<    log2SbW    )    +
DiagScanOrder[ log2SbW ][ log2SbH ][ n ][ 0 ]
    yC        =    (    yS    <<    log2SbH    )    +
DiagScanOrder[ log2SbW ][ log2SbH ][ n ][ 1 ]
    if( sb_coded_flag[ xS ][ yS ] )
        dec_abs_level[ n ]                                            ae(v)
    if( AbsLevel[ xC ][ yC ] > 0 ) {
        if( lastSigScanPosSb = = −1 )
            lastSigScanPosSb = n
        firstSigScanPosSb = n
    }
    if( ph_dep_quant_enabled_flag )
        QState       =
QStateTransTable[ QState ][ AbsLevel[ xC ][ yC ] & 1 ]
}
if( ph_dep_quant_enabled_flag | | !pic_sign_data_hiding_enabled_flag )
    signHidden = 0
else
    signHidden = ( lastSigScanPosSb − firstSigScanPosSb > 3 ? 1 : 0 )
for( n = numSbCoeff − 1; n >= 0; n− − ) {
    xC        =    (    xS    <<    log2SbW    )    +
DiagScanOrder[ log2SbW ][ log2SbH ][ n ][ 0 ]
    yC        =    (    yS    <<    log2SbH    )    +
DiagScanOrder[ log2SbW ][ log2SbH ][ n ][ 1 ]
    if( ( AbsLevel[ xC ][ yC ] > 0 ) &&
        ( !signHidden | | ( n != firstSigScanPosSb ) ) )
```

```
          coeff_sign_flag[ n ]                                    ae(v)
       }
       if( ph_dep_quant_enabled_flag ) {
          QState = startQStateSb
          for( n = numSbCoeff − 1; n >= 0; n− − ) {
             xC = ( xS << log2SbW ) +
DiagScanOrder[ log2SbW ][ log2SbH ][ n ][ 0 ]
             yC = ( yS << log2SbH ) +
DiagScanOrder[ log2SbW ][ log2SbH ][ n ][ 1 ]
             if( AbsLevel[ xC ][ yC ] > 0 )
                TransCoeffLevel[ x0 ][ y0 ][ cIdx ][ xC ][ yC ] =
                            ( 2 * AbsLevel[ xC ][ yC ] −
( QState > 1 ? 1 : 0 ) ) *
                            ( 1 − 2 * coeff_sign_flag[ n ] )
             QState =
QStateTransTable[ QState ][ AbsLevel[ xC ][ yC ] & 1 ]
          }
       } else {
          sumAbsLevel = 0
          for( n = numSbCoeff − 1; n >= 0; n− − ) {
             xC    =    (    xS    <<    log2SbW    )    +
DiagScanOrder[ log2SbW ][ log2SbH ][ n ][ 0 ]
             yC    =    (    yS    <<    log2SbH    )    +
DiagScanOrder[ log2SbW ][ log2SbH ][ n ][ 1 ]
             if( AbsLevel[ xC ][ yC ] > 0 ) {
                TransCoeffLevel[ x0 ][ y0 ][ cIdx ][ xC ][ yC ] =
                   AbsLevel[ xC ][ yC ] * ( 1 − 2 *
coeff_sign_flag[ n ] )
                if( signHidden ) {
                   sumAbsLevel += AbsLevel[ xC ][ yC ]
                   if( ( n = = firstSigScanPosSb ) &&
( sumAbsLevel % 2 ) = = 1 ) )
                TransCoeffLevel[ x0 ][ y0 ][ cIdx ][ xC ][ yC ] =
                −TransCoeffLevel[ x0 ][ y0 ][ cIdx ][ xC ][ yC ]
                }
             }
          }
       }
    }
}
```

| residual_ts_coding( x0, y0, log2TbWidth, log2TbHeight, cIdx ) { | Descriptor |
|---|---|
| log2SbW = ( Min( log2TbWidth, log2TbHeight) < 2 ? 1 : 2 ) | |
| log2SbH = log2SbW | |
| if( log2TbWidth + log2TbHeight > 3 ) | |
|   if( log2TbWidth < 2 ) { | |
|     log2SbW = log2Tb Width | |
|     log2SbH = 4 − log2SbW | |
|   } else if( log2TbHeight < 2 ) { | |
|     log2SbH = log2TbHeight | |
|     log2SbW = 4 − log2SbH | |
|   } | |
| numSbCoeff = 1 << ( log2SbW + log2SbH ) | |
| lastSubBlock = ( 1 << ( log2TbWidth + log2TbHeight − ( log2SbW + log2SbH ) ) ) − 1 | |
| inferSbCbf = 1 | |
| RemCcbs = ( ( 1 << ( log2TbWidth + log2TbHeight ) ) * 7 ) >> 2 | |
| for( i =0; i <= lastSubBlock; i++ ) { | |
|   xS = DiagScanOrder[ log2TbWidth − log2SbW ][ log2TbHeight − log2SbH ][ i ][ 0 ] | |
|   yS = DiagScanOrder[ log2TbWidth − log2SbW ][ log2TbHeight − log2SbH ][ i ][ 1 ] | |
|   if( i != lastSubBlock \|\| !inferSbCbf ) | |
|     sb_coded_flag[ xS ][ yS ] | ae(v) |
|   if( sb_coded_flag[ xS ][ yS ] && i < lastSubBlock ) | |
|     inferSbCbf = 0 | |
|   /* First scan pass */ | |
|   inferSbSigCoeffFlag = 1 | |
|   lastScanPosPass1 = −1 | |
|   for( n = 0; n <= numSbCoeff − 1 && RemCcbs >= 4; n++ ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( sb_coded_flag[ xS ][ yS ] && | |
|       ( n != numSbCoeff − 1 \|\| !inferSbSigCoeffFlag ) ) { | |

```
        sig_coeff_flag[ xC ][ yC ]                                              ae(v)
        RemCcbs− −
        if( sig_coeff_flag[ xC ][ yC ] )
           inferSbSigCoeffFlag = 0
     }
     CoeffSignLevel[ xC ][ yC ] = 0
     if( sig_coeff_flag[ xC ][ yC ] {
        coeff_sign_flag[ n ]                                                    ae(v)
        RemCcbs− −
        CoeffSignLevel[ xC ][ yC ] = ( coeff_sign_flag[ n ] > 0 ?
−1 : 1 )
        abs_level_gtx_flag[ n ][ 0 ]                                            ae(v)
        RemCcbs− −
        if( abs_level_gtx_flag[ n ][ 0 ] ) {
           par_level_flag[ n ]                                                  ae(v)
           RemCcbs− −
        }
     }
     AbsLevelPass1[ xC ][ yC ] =
        sig_coeff_flag[ xC ][ yC ] + par_level_flag[ n ] +
abs_level_gtx_flag[ n ][ 0 ]
     lastScanPosPass1 = n
  }
  /* Greater than X scan pass (numGtXFlags=5) */
  lastScanPosPass2 = −1
  for( n = 0; n <= numSbCoeff − 1 && RemCcbs >= 4; n++ ) {
     xC      =      (      xS      <<      log2SbW      )      +
DiagScanOrder[ log2SbW ][ log2SbH ][ n ][ 0 ]
     yC      = (      yS      <<      log2SbH      )      +
DiagScanOrder[ log2SbW ][ log2SbH ][ n ][ 1 ]
     AbsLevelPass2[ xC ][ yC ] = AbsLevelPass1[ xC ][ yC ]
     for( j − 1; j < 5; j++ ) {
        if( abs_level_gtx_flag[ n ][ j − 1 ] ) {
           abs_level_gtx_flag[ n ][ j ]                                         ae(v)
           RemCcbs− −
        }
     AbsLevelPass2[ xC ][ yC ] + = 2 * abs_level_gtx_flag[ n ][ j ]
     }
     lastScanPosPass2 = n
  }
  /* remainder scan pass */
  for( n = 0; n <= numSbCoeff − 1; n++ ) {
     xC      =      (      xS      <<      log2SbW      )      +
DiagScanOrder[ log2SbW ][ log2SbH ][ n ][ 0 ]
     yC      =      (      yS      <<      log2SbH      )      +
DiagScanOrder[ log2SbW ][ log2SbH ][ n ][ 1 ]
     if( ( n <= lastScanPosPass2 && AbsLevelPass2[ xC ][ yC ] >= 10 ) | |
        ( n > lastScanPosPass2 && n <= lastScanPosPass1 &&
           AbsLevelPass1[ xC ][ yC ] >= 2 ) | |
        ( n > lastScanPosPass1 && sb_coded_flag[ xS ][ yS ] ) )
        abs_remainder[ n ]                                                      ae(v)
     if( n <= lastScanPosPass2 )
        AbsLevel[ xC ][ yC ]                                                  =
AbsLevelPass2[ xC ][ yC ] + 2 * abs_remainder[ n ]
     else if( n <= lastScanPosPass1 )
        AbsLevel[ xC ][ yC ]                                                  =
AbsLevelPass1[ xC ][ yC ] + 2 * abs_remainder[ n ]
     else { /* bypass */
        AbsLevel[ xC ][ yC ] = abs_remainder[ n ]
        if( abs_remainder[ n ] )
           coeff_sign_flag[ n ]                                                 ae(v)
     }
     if( BdpcmFlag[ x0 ][ y0 ][ cIdx ] = = 0 && n <= lastScanPosPass1 )
{
        absLeftCoeff = xC > 0 ? AbsLevel[ xC − 1 ][ yC ] ) : 0
        absAboveCoeff = yC > 0 ? AbsLevel[ xC ][ yC − 1 ] ) : 0
        predCoeff = Max( absLeftCoeff, absAboveCoeff )
        if( AbsLevel[ xC ][ yC ] = = 1 && predCoeff > 0 )
           AbsLevel[ xC ][ yC ] = predCoeff
        else if( AbsLevel[ xC ][ yC ] > 0 && AbsLevel[ xC ][ yC ]
<= predCoeff )
           AbsLevel[ xC ][ yC ]− −
     }
  }
```

-continued

```
  TransCoeffLevel[ x0 ][ y0 ][ cIdx ][ xC ][ yC ] = ( 1 − 2 *
coeff_sign_flag[ n ] ) *
    AbsLevel[ xC ][ yC ]
    }
}
```

2.9.1. Context Modeling and Context Index Offset Derivation of Sign Flag coeff_sign_flag

TABLE 51

Association of ctxIdx and syntax elements for each initializationType in the initialization process

| Syntax structure | Syntax element | ctxTable | initType 0 | 1 | 2 |
|---|---|---|---|---|---|
| residual_coding( ) | last_sig_coeff_x_prefix | Table 119 | 0 . . . 22 | 23 . . . 45 | 46 . . . 68 |
| | last_sig_coeff_y_prefix | Table 120 | 0 . . . 22 | 23 . . . 45 | 46 . . . 68 |
| | sb_coded_flag[ ][ ] | Table 121 | 0 . . . 7 | 8 . . . 15 | 16 . . . 23 |
| | sig_coeff_flag[ ][ ] | Table 122 | 0 . . . 62 | 63 . . . 125 | 126 . . . 188 |
| | par_level_flag[ ] | Table 123 | 0 . . . 32 | 33 . . . 65 | 66 . . . 98 |
| | abs_level_gtx_flag[ ][ ] | Table 124 | 0 . . . 73 | 74 . . . 147 | 148 . . . 220 |
| | coeff_sign_flag[ ] | Table 125 | 0 . . . 5 | 6 . . . 11 | 12 . . . 17 |

TABLE 125

Specification of initValue and shiftIdx for ctxInc of coeff_sign_flag

| Initialization variable | ctxIdx of coeff_sign_flag | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| initValue | EP | EP | EP | EP | EP | EP | EP | EP | EP | EP | EP | EP | EP | EP | EP | EP | EP | EP |
| shiftIdx | 0 | 0 | 0 | 0 | 0 | 0 | 0 | 0 | 0 | 0 | 0 | 0 | 0 | 0 | 0 | 0 | 0 | 0 |

TABLE 131

Assignment of ctxInc to syntax elements with context coded bins

| Syntax element | binIdx | | | | | |
|---|---|---|---|---|---|---|
| | 0 | 1 | 2 | 3 | 4 | >=5 |
| coeff_sign_flag[ ] transform_skip_flag[ x0 ] [ y0 ][ cIdx ] == 0 \|\| RemCcbs == 0 \|\| slice_ts_residual_coding_disabled_flag | bypass | na | na | na | na | na |
| coeff_sign_flag[ ] transform_skip_flag[ x0 ] [ y0 ][ cIdx ] == 1 && RemCcbs >= 0 && !slice_ts_residual_coding_disabled_flag | 0 . . . 5 (clause 9.3.4.2.10) | na | na | na | na | na |

9.3.4.2.10 Derivation Process of ctxInc for the Syntax Element coeff_sign_flag for Transform Skip Mode Inputs to this process are the colour component index cIdx, the luma location (x0, y0) specifying the top-left sample of the current transform block relative to the top-left sample of the current picture, the current coefficient scan location (xC, yC)

Output of this process is the variable ctxInc.

The variables leftSign and aboveSign are derived as follows:

$$\text{leftSign} = (xC == 0)?0 : \text{CoeffSignLevel}[xC-1][yC] \quad (1595)$$

$$\text{aboveSign} = (yC == 0)?0 : \text{CoeffSignLevel}[xC][yC-1] \quad (1596)$$

The variable ctxInc is derived as follows:

If leftSign is equal to 0 and aboveSign is equal to 0, or if leftSign is equal to −aboveSign, the following applies:

$$ctxInc = (Bdpcm\text{Flag}[x0][y0][cIdx] == 0?0:3) \quad (1597)$$

Otherwise, if leftSign is greater than or equal to 0 and aboveSign is greater than or equal to 0, the following applies:

$$ctxInc = (Bdpcm\text{Flag}[x0][y0][cIdx]?1:4) \quad (1598)$$

Otherwise, the following applies:

$$ctxInc = (Bdpcm\text{Flag}[x0][y0][cIdx]?2:5) \quad (1599)$$

3. Technical Problems Solved by Disclosed Technical Solutions and Embodiments

The current design of derivation process of context for AMVR precision index and split CU vertical flag has the following problems:

1. The context modeling for the syntax element which specifies that a block is split horizontally or vertically (e.g., mtt_split_cu_vertical_flag) is dependent on the relation ship between "allowSplitBtVer+allowSplitBtHor" and "allowSplitTtVer+allowSplitTtHor". However, it is noticed that the correlation between the splitting information and allowing binary tree (BT)/ternary tree (TT) vertical compared to allowing BT/TT horizontal is higher.
2. In current VVC, the first bin of AMVR precision index (e.g., amvr_precision_idx) is context coded with one context without considering whether the block is coded with IBC mode, or affine mode, or normal inter mode (non-IBC, non-affine). It may be less efficient to code the AMVR precision index. In addition, for the $2^{nd}$ bin of the amvr_precision_idx to be coded for blocks with normal inter mode, it uses a separate context which is different from the context used for the $1^{st}$ bin of the amvr_precision_idx. Multiple contexts used for coding a syntax element may be suboptimal when the syntax element is less frequently coded.
3. Although the coefficient coding can achieve coding benefits on screen content coding, the coefficients coding and TS mode may still have some drawbacks.
   a. Whether to use bypass coding or context coding for the sign flags is unclear for the case:
      i. The number of remaining allowed context coded bins (denoted by RemCcbs) is equal to 0.
      ii. The current block is coded with TS mode.
      iii. slice_ts_residual_coding_disabled_flag is false.

4. A Listing of Technical Solutions and Embodiments

The items below should be considered as examples to explain general concepts. These items should not be interpreted in a narrow way. Furthermore, these items can be combined in any manner.

In this disclosure, the term AMVR represents a coding tool that adaptive motion vector difference resolution is used for motion vector (MV)/MV differences (MVD) coding or MV Predictor (MVP). It is not limited to the AMVR and block partitioning technologies described in VVC.

The term amvr_precision_idx represents a syntax element specifying an index (or an indicator) of the allowable motion vector difference resolutions. In one example, it may be the amvr_precision_idx defined in the VVC text. Note that the amvr_precision_idx may be binarized to a bin string which may include one or multiple bins.

The term mtt_split_cu_vertical_flag represents a syntax element specifying whether a coding block is vertically partitioned or not. In one example, it may be the mtt_split_cu_vertical_flag defined in the VVC text.

Derivation of Context for amvr_precision_idx
1. Context modeling (e.g., how to select a context) for the first (with bin index equal to 0) and/or other bins of the bin string of a syntax element (SE) indicating the usage of AMVR (such as amvr_precision_idx and/or amvr_flag) may be dependent on the coded information (e.g., the coded mode) of current block and/or neighboring blocks.
   a. In one example, coded information may comprise at least one of IBC, affine AMVR, and normal inter (e.g., non-IBC, non-affine) modes, bi-prediction and/or uni-prediction, block dimension of current block and/or block dimension of neighboring blocks, and different contexts may be utilized for coding a bin (e.g., the first bin) according to the coded information.
      i. Alternatively, furthermore, one bin (e.g. the $1^{st}$ bin) of the SE for IBC coded block is coded with a single context denoted by CtxM.
      ii. Alternatively, furthermore, one bin (e.g. the $1^{st}$ bin) of the SE for affine coded block is coded with a single context denoted by CtxN.
      iii. Alternatively, furthermore, one bin (e.g. the $1^{st}$ bin) of the SE for normal inter (e.g., non-affine and non-IBC) coded block is coded with a single context denoted by CtxP.
      iv. Alternatively, furthermore, at least one of the three contexts CtxM, CtxN and CtxP is different from the other two.
      v. Alternatively, furthermore, each of the three contexts CtxM, CtxN and CtxP is different from the others.
      vi. For example, one bin (e.g. the $1^{st}$ bin) of the SE is coded with a single context denoted by CtxBi for a bi-predicted block and it is coded with a single context denoted by CtxUni for a uni-predicted coded block.
         1) In one example, CtxBi is different from CtxUni.
   b. In one example, more than one context may be utilized for coding the first bin and/or other bins of the bin string of the SE.
      i. In one example, X contexts may be utilized for the first bin wherein X>1.
         1) In one example, X=3.
            a) Alternatively, furthermore, the selection of the contexts is dependent on the coded information (e.g., modes mentioned above).
         2) In one example, X=2
            a) Alternatively, furthermore, the selection of the contexts is dependent on the coded information (e.g., modes mentioned above) and one context for IBC coded blocks and the other one for other blocks (e.g., coded with affine or normal inter).
            b) Alternatively, furthermore, the selection of the contexts is dependent on the coded information (e.g., modes mentioned above) and one context for IBC and affine AMVR coded blocks and the other one for other blocks (e.g., coded with normal inter).
   c. In one example, different models for the first (with bin index equal to 0) and/or other bins of the bin string of the SE depending on the coded information (e.g., the coded mode) may be initialized with different initializing values.
   d. In one example, different models for the first (with bin index equal to 0) and/or other bins of the bin string of the SE depending on the coded information (e.g., the coded mode) may be initialized with same initializing values.
2. Instead of using different contexts for $1^{st}$ and $2^{nd}$ bins of the bin string of the amvr_precision_idx, it is proposed that contexts used for coding the $2^{nd}$ bin may be the same as one or more of the contexts used for coding the $1^{st}$ bin of the bin string.
   a. Alternatively, the $2^{nd}$ bin of the bin string is coded only for normal inter (e.g., non-affine and non-IBC) coded block
   b. Alternatively, the $2^{nd}$ bin of the bin string is coded with a single context denoted by CtxQ.
   c. Alternatively, furthermore, the same context may be used for coding the $1^{st}$ bin of amvr_precision_idx for IBC coded block and the $2^{nd}$ bin of amvr_precision_idx for normal inter coded block.
   d. Alternatively, furthermore, the same context may be used for coding the $1^{st}$ bin of amvr_precision_idx for affine coded block, and the $2^{nd}$ bin of amvr_precision_idx for normal inter coded block.
  e. Alternatively, furthermore, the same context may be used for coding the $1^{st}$ bin of amvr_precision_idx for normal inter coded block, and the $2^{nd}$ bin of amvr_precision_idx for normal inter coded block.
3. The same context may be used for coding the $1^{st}$ bin of amvr_precision_idx for IBC coded block (denoted by CtxM) and the $2^{nd}$ bin of amvr_precision_idx for normal inter coded block (denoted by CtxQ), such as CtxM=CtxQ.
  a. In one example, X1 (such as X1=3) contexts may be utilized for coding amvr_precision_idx.
  b. Alternatively, furthermore, different contexts for coding the $1^{st}$ bin of the bin string of amvr_precision_idx for non-IBC coded blocks may be utilized.
4. The same context may be used for coding the $1^{st}$ bin of amvr_precision_idx for IBC coded block, the $1^{st}$ bin of amvr_precision_idx for affine coded block, and the $1^{st}$ bin of amvr_precision_idx for normal inter coded block, such as CtxM=CtxN=CtxP.
  a. In one example, X2 (such as X2=2) contexts may be utilized for coding amvr_precision_idx.
  b. Alternatively, furthermore, different contexts for coding the $1^{st}$ bin of the bin string of amvr_precision_idx for non-IBC and non-affine coded blocks may be utilized.
5. The same context may be used for coding the $1^{st}$ bin of amvr_precision_idx for IBC coded block and the $1^{st}$ bin of amvr_precision_idx for normal inter coded block, such as CtxM=CtxP.
  a. In one example, X3 (such as X3=3) contexts may be utilized for coding amvr_precision_idx.
  b. Alternatively, furthermore, different contexts for coding the $1^{st}$ bin of the bin string of amvr_precision_idx for non-IBC and non-normal inter coded blocks (e.g., coded with affine AMVR) may be utilized.
  c. Alternatively, furthermore, different contexts for coding the $2^{nd}$ bin of the bin string of amvr_precision_idx may be utilized.
6. The same context may be used for coding the $1^{st}$ bin of amvr_precision_idx for IBC coded block and the $1^{st}$ bin of amvr_precision_idx for affine coded block, such as CtxM=CtxN.
7. The same context may be utilized to code all bins of amvr_precision_idx for IBC coded block, affine coded block, and normal inter coded block.
  a. In one example, a single context may be utilized for coding amvr_precision_idx.
8. Multiple contexts may be utilized to code the $1^{st}$ bin of amvr_precision_idx for IBC coded block, affine coded block, and normal inter coded block, and a single context may be utilized to code the $2^{nd}$ bin which is different from those used for coding the $1^{st}$ bin.
  a. In one example, X4 (such as X4=4) contexts may be utilized for coding amvr_precision_idx.
  b. For example, CtxM !=CtxQ !=CtxN !=CtxP.
9. It is proposed that at least one context used for coding the amvr_precision_idx may be the same as that use for coding the amvr_flag.
  a. The same context for coding AMVR flag (e.g., amvr_flag) of affine coded blocks may be utilized for the $1^{st}$ bin of amvr_precision_idx for IBC coded block, or/and the $1^{st}$ bin of amvr_precision_idx for affine coded block, or/and the $1^{st}$ bin or/and the $2^{nd}$ bin of amvr_precision_idx for normal inter coded block.
  b. The same context for coding AMVR flag (e.g., amvr_flag) of non-affine coded blocks may be utilized for the $1^{st}$ bin of amvr_precision_idx for IBC coded block, or/and the $1^{st}$ bin of amvr_precision_idx for affine coded block, or/and the $1^{st}$ bin or/and the $2^{nd}$ bin of amvr_precision_idx for normal inter coded block.
  c. The context modeling for the $1^{st}$ bin of amvr_precision_idx is dependent on whether affine mode is applied for the block.
    i. Alternatively, furthermore, one context is used for coding the $1^{st}$ bin of affine coded block and the other context is used for non-affine coded blocks (e.g., including normal inter and IBC coded blocks).
    ii. Alternatively, furthermore, a first context is used for coding the $1^{st}$ bin of affine coded block and a second context is used for non-affine coded blocks (e.g., including normal inter and IBC coded blocks). And the first context is the same as that used for coding amvr_flag of affine coded blocks; and the second context is the same as that used for coding amvr_flag of non-affine coded blocks Derivation of Context for mtt_split_cu_vertical_flag Let the variables allowSplitBtVer, allowSplitBtHor, allowSplitTtVer, and allowSplitTtHor denote whether vertical BT split, horizontal BT split, vertical TT split, and horizontal TT split are allowed for the current coding tree node, respectively. And the value of allowSplitBtVer, allowSplitBtHor, allowSplitTtVer, and allowSplitTtHor could be equal to 0 or 1, which are derived in section 2.6. Denote the width of current block, the height of current block, the width of left neighbouring block, the height of left neighbouring block, the width of above neighbouring block and the height of above neighbouring block by curW, curH, leftW, leftH, aboveW, and aboveH, respectively. Let "numV" be a value equal to the sum of allowSplitBtVer and allowSplitTtVer, and "numH" be a value equal to the sum of allowSplitBtHor and allowSplitTtHor.

10. Context modeling for a SE indicating block splitting information (e.g., mtt_split_cu_vertical_flag) may be dependent on the numbers of allowing vertical split (e.g., for BT and TT) and allowing horizontal split (e.g., for BT and TT).
    a. In one example, if there are more cases that vertical split is allowed compared to horizontal split (e.g., numV>numH), a first set of contexts are utilized.
    b. In one example, if there are less cases that vertical split is allowed compared to horizontal split (e.g., numV<numH), a second set of contexts are utilized.
    c. In one example, if there are same cases that vertical split is allowed compared to horizontal split (e.g., numV=numH), a third set of contexts are utilized.
    d. Alternatively, furthermore, none of the contexts in the first/second/third sets is the same.
    e. Alternatively, furthermore, at least one of the contexts in the first/second/third sets is the same as that included in another set.
    f. Alternatively, furthermore, numbers of contexts for each of the three sets may be dependent on the set index.
      i. In one example, only one context is included in the first and/or second set.

ii. In one example, multiple contexts are included in the third set.
1) Alternatively, furthermore, the selection of a context from the third set may be further depend on availability of above and left neighboring blocks, and/or block dimension of current block and block dimension of the neighboring blocks.
g. An example is presented in embodiment #4 of section 5.4.
h. An example is presented in embodiment #5 of section 5.5.
11. A SE indicating whether to split a block vertically (e.g. mtt_split_cu_vertical_flag) is coded with N contexts, which may depend on whether BT/TT split is allowed, or/and the width/height of current block, or/and the width/height of neighbouring blocks.
i. In one example, which context is used to code the SE may be dependent on numV and numH.
i. For example, it depends on whether numV is greater than numH.
ii. For example, it depends on whether numV is smaller than numH.
iii. For example, it depends on means whether numV is equal to numH.
j. In one example, the bin string of the SE may be context coded with N contexts depending on whether BT/TT split is allowed.
i. In one example, the SE is coded with a context denoted by CtxA when numV is greater than numH.
ii. In one example, the SE is coded with a context denoted by CtxB when numV is less than numH.
iii. In one example, the SE is coded with a context denoted by CtxC when numV is equal to numH.
iv. In one example, CtxA is equal to CtxB, and CtxB is equal to CtxC (e.g., CtxA=CtxB=CtxC), such as CtxA=CtxB=CtxC=0.
v. In one example, CtxA !=CtxB !=CtxC, such as CtxA=0, CtxB=1, CtxC=2.
k. In one example, the bin string of the SE may be context coded with N contexts depending on the width/height of current block, or/and the width/height of neighbouring blocks.
i. In one example, the neighbouring blocks may refer to the above neighbouring block, or/and left neighbouring block.
ii. In one example, the SE is coded with N contexts, which may depend on a function of the width or height of current block, or/and the width or height of neighbouring blocks. Denote dA=curW/aboveW and dL=curH/leftH.
1) In one example, the SE is coded with a context denoted by CtxD when either left neighbouring block or above neighbouring block is unavailable, or dA is equal to dL.
2) In one example, the SE is coded with a context denoted by CtxE when dA is less than dL.
3) In one example, the SE is coded with a context denoted by CtxF when dA is larger than dL.
l. In one example, the bin string of the SE may be context coded with N contexts depending on whether BT/TT split is allowed, or/and the width/height of current block, or/and the width/height of neighbouring blocks.
i. In one example, the SE is coded with a context denoted by CtxA when numV is greater than numH.
ii. In one example, the SE is coded with a context denoted by CtxB when numV is less than numH.
iii. In one example, the SE is coded with a context denoted by CtxC when numV is equal to numH and (either left neighbouring block or above neighbouring block is unavailable, or dA is equal to dL).
iv. In one example, the SE is coded with a context denoted by CtxE when numV is equal to numH and dA is less than dL.
v. In one example, the SE is coded with a context denoted by CtxF when numV is equal to numH and dA is larger than dL.
In one example, N=5, CtxA !=CtxB !=CtxC !=CtxE !=CtxF.
m. In one example, the bin string of the SE may be context coded with N contexts depending on whether the current block is at the picture boundary.
n. In one example, the bin string of the SE may be context coded with N contexts depending on whether dual-tree and/or local dual-tree is applied.
o. In one example, the bin string of the SE may be context coded with N contexts depending on the color component(s) of the samples to be partitioned.
p. In one example, the bin string of the SE may be context coded with N contexts depending on the width/height of current block.
i. In one example, the context increasement may be set to a function of the block width or height.
12. The split CU vertical flag (e.g., mtt_split_cu_vertical_flag) may be coded with a single context.

How to Use Bypass Coding or Context Coding for the Coefficient Sign Flags

13. Whether to use context coding or bypass coding for the sign of a transform coefficient level (e.g., the syntax element coeff_sign_flag) is dependent on the number of remaining allowed context coded bins (e.g., RemCcbs) and/or the kind of transform used for the current block (such as discrete cosine transform (DCT) 2, discrete sine transform (DST) 7 or transform-skip).
a. In one example, in the procedure of transform skip residual coding, when RemCcbs is greater than T1 (such as T1=0), context coding may be used for coeff_sign_flag.
i. Additionally, in the procedure of transform skip residual coding, when RemCcbs is equal to T1 (such as T1=0), bypass coding may be used for coeff_sign_flag.
b. In one example, in the procedure of transform skip residual coding, when RemCcbs is greater than or equal to T2 (such as T2=3), context coding may be used for coeff_sign_flag.
i. Additionally, in the procedure of transform skip residual coding, when RemCcbs is less than T2 (such as T2=3), bypass coding may be used for coeff_sign_flag.
14. At the beginning of the bypass coding for the remaining syntax elements (e.g., the syntax elements abs_remainder and coeff_sign_flag) in the third/remainder coefficient scan pass of the transform skip residual coding process, an operation may be applied to the variable specifying the number of the remaining allowed context coded bins (e.g., RemCcbs).
  c. In one example, the operation may be setting RemCcbs to be equal to a certain value (such as 0).
  d. In one example, the operation may be setting RemCcbs to be equal to a value depending on at least one variable or syntax element excluding RemCcbs.
    i. In one example, the operation may be setting RemCcbs to be equal to RemCcbs minus one.
15. An example is presented in embodiment #7 of section 5.7.
16. An example is presented in embodiment #8 of section 5.8.
17. Whether a transform coefficient level (e.g., coeff_sign_flag) is coded with bypass mode with bypass mode or context-coding mode may depend on the number of remaining allowed context coded bins (e.g., RemCcbs).
  e. It is proposed that sign of a transform coefficient level (e.g., coeff_sign_flag) is coded with bypass mode when the number of remaining allowed context coded bins (e.g., RemCcbs) is smaller than N.
  f. In one example, the sign flags are coded with bypass mode when RemCcbs<=N.
    i. Alternatively, in one example, the sign flags are coded with context mode when RemCcbs>N.
  g. In one example, the sign flags are coded with bypass mode when RemCcbs is equal to N.
    i. Alternatively, in one example, the sign flags are coded with bypass mode when RemCcbs>N.
    ii. In one example, N may be set equal to 4.
      1) Alternatively, in one example, N may be set equal to 0.
    iii. In on example, RemCcbs may be modified to X before decoding the remaining absolute values of transform coefficient levels, where X is equal to N.
  h. In one example, the sign flags are coded with bypass mode when RemCcbs is less than N.
    i. Alternatively, in one example, the sign flags are coded with context mode when RemCcbs>=N.
    ii. In one example, N may be set equal to 3.
    iii. In on example, RemCcbs may be modified to X before decoding the remaining absolute values of transform coefficient levels, where X is less than N.
  i. In one example, N is an integer number and may be based on,
    i. An indication signalled in the sequence parameter set (SPS)/video parameter set (VPS)/picture parameter set (PPS)/picture header/slice header/tile group header/largest coding unit (LCU) row/group of LCUs/LCU/CU
    ii. The block dimensions of the current block and/or its neighboring blocks
    iii. The block shapes of the current block and/or its neighboring blocks
    iv. An indication of the color format (such as 4:2:0, 4:4:4)
    v. Whether the separate or dual coding tree structure is in use
    vi. Slice type and/or picture type
    vii. The number of color components
  j. The coding context used to code a transform coefficient level (e.g., coeff_sign_flag) may depend on the number of remaining allowed context coded bins (e.g., RemCcbs).
  k. The above examples may be applied on transform blocks and/or transform skip blocks including or excluding block differential pulse coded modulation (BDPCM) coded blocks.

General
18. Whether to and/or how to apply the disclosed methods above may be signalled at sequence level/picture level/slice level/tile group level, such as in sequence header/picture header/SPS/VPS/dependency parameter set (DPS)/decoding capability information (DCI)/PPS/adaptation parameter set (APS)/slice header/tile group header.
19. Whether to and/or how to apply the disclosed methods above may be dependent on coded information, such as color format, single/dual tree partitioning.

5. Embodiments

Below are some example embodiments for some of the aspects summarized above in Section 4, which can be applied to the VVC specification. Most relevant parts that have been added or modified are underlined in boldface italics, and some of the deleted parts are indicated using [[ ]].

5.1. Embodiment 1

9.3.2.2 Initialization Process for Context Variables

TABLE 51

Association of ctxIdx and syntax elements for each initializationType in the initialization process

| Syntax structure | Syntax element | ctxTable | initType 0 | 1 | 2 |
|---|---|---|---|---|---|
| coding_unit( ) | amvr_precision_idx[ ][ ] | Table 89 | 0 . . . [[1]]*2* | [[2]]*3* . . . [[3]]*5* | [[4]]*6* . . . [[5]]*8* |

TABLE 89

Specification of initValue and shiftIdx for ctxIdx of amvr_precision_idx

| Initialization variable | ctxIdx of amvr_precision_idx | | | | | | | | |
|---|---|---|---|---|---|---|---|---|---|
| | 0 | 1 | 2 | 3 | 4 | 5 | *6* | *7* | *8* |
| initValue | EP | EP | EP | EP | EP | EP | *EP* | *EP* | *EP* |
| shiftIdx | 0 | 0 | 0 | 0 | 0 | 0 | *0* | *0* | *0* |

9.3.4.2 Derivation Process for ctxTable, ctxIdx and bypass-Flag
9.3.4.2.1 General

TABLE 131

Assignment of ctxInc to syntax elements with context coded bins

| Syntax element | binIdx | | | | | |
|---|---|---|---|---|---|---|
| | 0 | 1 | 2 | 3 | 4 | >=5 |
| amvr_precision_idx[ ][ ] | [[0]]*(CuPredMode[ 0 ][ x 0 ][ y0 ] == MODE_IBC) ? X : (inter_affine_flag == 0 ? Y : Z)* | [[1]]*X* | na | na | na | na |

*Where any two of X, Y and Z are not equal to each other (e.g., X != Y != Z), such as, X = 1, Y = 0, Z = 2.*
*Alternative 1: X != Y != Z, X = 0, Y = 2, Z = 1.*
*Alternative 2: X != Y != Z, X = 0, Y = 1, Z = 2.*
*Alternative 3: X != Y != Z, X = 1, Y = 2, Z = 0.*
*Alternative 4: X != Y != Z, X = 2, Y = 0, Z = 1.*
*Alternative 5: X != Y != Z, X = 2, Y = 1, Z = 0.*

Alternatively, the following applies:

| Syntax element | binIdx | | | | | |
|---|---|---|---|---|---|---|
| | 0 | 1 | 2 | 3 | 4 | >=5 |
| amvr_precision_idx[ ][ ] | [[0]]*(CuPredMode[ 0 ][ x 0 ][ y0 ] == MODE_IBC) ? X : (inter_affine_flag == 0 ? Y : Z)* | [[1]]*W* | na | na | na | na |

In above example, X!=Y, X!=Z, Y!=Z.
Alternatively, furthermore, the following applies:
  1) In one example, W is equal to X.
  2) Alternatively, W is equal to Y.
  3) Alternatively, W is equal to Z.

5.2. Embodiment 2

9.3.2.2 Initialization Process for Context Variables

TABLE 51

Association of ctxIdx and syntax elements for each initializationType in the initialization process

| Syntax structure | Syntax element | ctxTable | initType | | |
|---|---|---|---|---|---|
| | | | 0 | 1 | 2 |
| coding_unit( ) | amvr_precision_idx[ ][ ] | Table 89 | 0 ... [[1]]*3* | [[2]]*4* ... [[3]]*7* | [[4]]*8* ... [[5]]*11* |

TABLE 89

Specification of initValue and shiftIdx for ctxIdx of amvr_precision_idx

| Initialization variable | ctxIdx of amvr_precision_idx | | | | | | | | | | | |
|---|---|---|---|---|---|---|---|---|---|---|---|---|
| | 0 | 1 | 2 | 3 | 4 | 5 | *6* | *7* | *8* | *9* | *10* | *11* |
| initValue | EP | EP | EP | EP | EP | EP | *EP* | *EP* | *EP* | *EP* | *EP* | *EP* |
| shiftIdx | 0 | 0 | 0 | 0 | 0 | 0 | *0* | *0* | *0* | *0* | *0* | *0* |

9.3.4.2 Derivation Process for ctxTable, ctxIdx and bypass-Flag
9.3.4.2.1 General

TABLE 131

Assignment of ctxInc to syntax elements with context coded bins

| Syntax element | binIdx | | | | | |
|---|---|---|---|---|---|---|
| | 0 | 1 | 2 | 3 | 4 | >=5 |
| amvr_precision_Idx[ ][ ] | [[0]](_CuPredMode[ 0 ][ x 0 ][ y0 ] == MODE IBC) ? X : (inter affine flag == 0 ? Y : Z)_ | [[1]]_W_ | na | na | na | na |

_Where any two of X, Y, Z, and W are not equal to each other (e.g., X != Y != Z != W), such as, X = 0, Y = 1, Z = 2, W = 3._

5.3. Embodiment 3

9.3.2.2 Initialization Process for Context Variables

TABLE 51

Association of ctxIdx and syntax elements for each initializationType in the initialization process

| Syntax structure | Syntax element | ctxTable | initType | | |
|---|---|---|---|---|---|
| | | | 0 | 1 | 2 |
| coding_unit( ) | amvr_precision_idx[ ][ ] | Table 89 | 0[[ . . . 1]] | [[2 . . . 3]]_1_ | [[4 . . . 5]]_2_ |

TABLE 89

Specification of initValue and shiftIdx for ctxIdx of amvr_precision_idx

| Initialization variable | ctxIdx of amvr_precision_idx | | | | | |
|---|---|---|---|---|---|---|
| | 0 | 1 | 2 | [[3 | 4 | 5]] |
| initValue | EP | EP | EP | [[EP | EP | EP]] |
| shiftIdx | 0 | 0 | 0 | [[0 | 0 | 0]] |

9.3.4.2 Derivation Process for ctxTable, ctxIdx and bypass-Flag
9.3.4.2.1 General

TABLE 131

Assignment of ctxInc to syntax elements with context coded bins

| Syntax element | binIdx | | | | | |
|---|---|---|---|---|---|---|
| | 0 | 1 | 2 | 3 | 4 | >=5 |
| amvr_precision_idx[ ][ ] | 0 | [[1]]_0_ | na | na | na | na |

5.4. Embodiment 4

The working draft can be changed as below.
9.3.4.2.3 Derivation Process of ctxIncfor the Syntax Element mtt_split_cu_vertical_flag
Input to this process is the luma location (x0, y0) specifying the top-left luma sample of the current luma block relative to the top-left sample of the current picture, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics in clause 7.4.11.4. Output of this process is ctxInc.

The location (xNbL, yNbL) is set equal to (x0-1, y0) and the derivation process for neighbouring block availability as specified in clause 6.4.4 is invoked with the location (xCurr, yCurr) set equal to (x0, y0) and the neighbouring location (xNbY, yNbY) set equal to (xNbL, yNbL), checkPredModeY set equal to FALSE, and cIdx as inputs, and the output is assigned to availableL.

The location (xNbA, yNbA) is set equal to (x0, y0-1) and the derivation process for neighbouring block availability as specified in clause 6.4.4 is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA.

The assignment of ctxInc is specified as follows:
  If allowSplitBtVer+[[allowSplitBtHor]] ]]_allowSplitTtVer_ is greater than [[allowSplitTtVer]] ]]_allowSplitBtHor_ +allowSplitTtHor, ctxInc is set equal to 4.
  Otherwise, if allowSplitBtVer+[[allowSplitBtHor]] ]]_allowSplitTtVer_ is less than [[allowSplitTtVer]] _allowSplitBtHor_ +allowSplitTtHor, ctxInc is set equal to 3.
  Otherwise, the following applies:
    The variables dA and dL are derived as follows $$dA = cbWidth/(availableA\,?\,CbWidth[chType][xNbA][yNbA]:1) \qquad (1563)$$

$$dL = cbHeight/(availableL\,?\,CbHeight[chType][xNbL][yNbL]:1) \qquad (1564)$$

If any of the following conditions is true, ctxInc is set equal to 0:
  dA is equal to dL,
  availableA is equal to FALSE,
  availableL is equal to FALSE.

Otherwise, if dA is less then dL, ctxInc is set equal to 1.

Otherwise, ctxInc is set equal to *2* .

5.5. Embodiment 5

The working draft can be changed as below.
9.3.4.2.3 Derivation Process of ctxIncfor the Syntax Element mtt_split_cu_vertical_flag Input to this process is the luma location (x0, y0) specifying the top-left luma sample of the current luma block relative to the top-left sample of the current picture, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics in clause 7.4.11.4. Output of this process is ctxInc.

The location (xNbL, yNbL) is set equal to (x0-1, y0) and the derivation process for neighbouring block availability as specified in clause 6.4.4 is invoked with the location (xCurr, yCurr) set equal to (x0, y0) and the neighbouring location (xNbY, yNbY) set equal to (xNbL, yNbL), checkPredModeY set equal to FALSE, and cIdx as inputs, and the output is assigned to availableL.

The location (xNbA, yNbA) is set equal to (x0, y0-1) and the derivation process for neighbouring block availability as specified in clause 6.4.4 is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA.

The assignment of ctxInc is specified as follows:
If allowSplitBtVer+[[allowSplitBtHor]] *allowSplitTtVer* is greater than [[allowSplitTtVer]] *allowSplitBtHor* +allowSplitTtHor, ctxInc is set equal to *X*.

Otherwise, if allowSplitBtVer+[[allowSplitBtHor]] *allowSplitTtVer* is less than [[allowSplitTtVer]] *allowSplitBtHor* +allowSplitTtHor, ctxInc is set equal to *Y*.

Otherwise, the following applies:
The variables dA and dL are derived as follows $$dA = cbWidth/(availableA?CbWidth[chType][xNbA][yNbA]:1) \quad (1563)$$

$$dL = cbHeight/(availableL?CbHeight[chType][xNbL][yNbL]:1) \quad (1564)$$

If any of the following conditions is true, ctxInc is set equal to *Z*:
dA is equal to dL,
availableA is equal to FALSE,
availableL is equal to FALSE.

Otherwise, if dA is less then dL, ctxInc is set equal to *W*.

Otherwise, ctxInc is set equal to *V*.
*Where X != Y != Z != W != V, such*
*as X = 4, Y = 3, Z = 0, W = 1, V = 2.*
*Alternative 1: X = 3, Y = 4, Z = 0, W = 1, V = 2.*
*Alternative 2: X = 4, Y = 3, Z = 2, W = 1, V = 0.*
*Alternative 3: X = 0, Y = 1, Z = 2, W = 3, V = 4.*

5.6. Embodiment 6

The working draft can be changed as below.
9.3.2.2 Initialization Process for Context Variables

TABLE 51

Association of ctxIdx and syntax elements for each initializationType in the initialization process

| Syntax structure | Syntax element | ctxTable | initType 0 | 1 | 2 |
|---|---|---|---|---|---|
| coding_tree( ) | mtt_split_cu_vertical_flag | Table 61 | 0[[ . . . 4]] | [[5 . . . 9]]*1* | [[10 . . . 14]]*2* |

TABLE 61

Specification of initValue and shiftIdx for ctxInc of mtt_split_cu_vertical_flag

| Initialization variable | ctxIdx of mtt_split_cu_vertical_flag | | | | | | | | | | | | | | |
|---|---|---|---|---|---|---|---|---|---|---|---|---|---|---|---|
| | 0 | 1 | 2 | [[3 | 4 | 5 | 6 | 7 | 8 | 9 | 10 | 11 | 12 | 13 | 14]] |
| initValue | EP | EP | EP | [[EP | EP | EP | EP | EP | EP | EP | EP | EP | EP | EP | EP]] |
| shiftIdx | 0 | 0 | 0 | [[0 | 0 | 0 | 0 | 0 | 0 | 0 | 0 | 0 | 0 | 0 | 0]] |

9.3.4.2 Derivation Process for ctxTable, ctxIdx and bypassFlag
9.3.4.2.1 General

TABLE 131

Assignment of ctxInc to syntax elements with context coded bins

| Syntax element | binIdx | | | | | |
|---|---|---|---|---|---|---|
| | 0 | 1 | 2 | 3 | 4 | >=5 |
| mtt_split_cu_vertical_flag | 0[[ . . . 4 (clause 9.3.4.2.3)]] | na | na | na | na | na |

9.3.4.2.3 Derivation Process of ctxIncfor the Syntax Element mtt_split_cu_vertical_flag Input to this process is the luma location (x0, y0) specifying the top-left luma sample of the current luma block relative to the top-left sample of the current picture, the dual tree channel type chType, the width and the height of the current coding block in luma samples cbWidth and cbHeight, and the variables allowSplitBtVer, allowSplitBtHor, allowSplit- TtVer, allowSplitTtHor, and allowSplitQt as derived in the coding tree semantics in clause 7.4.11.4. Output of this process is ctxInc.
The location (xNbL, yNbL) is set equal to (x0-1, y0) and the derivation process for neighbouring block availability as specified in clause 6.4.4 is invoked with the location (xCurr, yCurr) set equal to (x0, y0) and the neighbouring location (xNbY, yNbY) set equal to (xNbL, yNbL), checkPredModeY set equal to FALSE, and cIdx as inputs, and the output is assigned to availableL.
The location (xNbA, yNbA) is set equal to (x0, y0-1) and the derivation process for neighbouring block availability as specified in clause 6.4.4 is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA.
The assignment of ctxInc is specified as follows:
  If allowSplitBtVer+allowSplitBtHor is greater than allowSplitTtVer+allowSplitTtHor, ctxInc is set equal to 4.
  Otherwise, if allowSplitBtVer+allowSplitBtHor is less than allowSplitTtVer+allowSplitTtHor, ctxInc is set equal to 4.

Otherwise, the following applies:
  The variables dA and dL are derived as follows $$dA = cbWidth/(availableA\,?\,CbWidth[chType][xNbA][yNbA]:1) \quad (1563)$$

$$dL = cbHeight/(availableL\,?\,CbHeight[chType][xNbL][yNbL]:1) \quad (1564)$$

If any of the following conditions is true, ctxInc is set equal to 0:
    dA is equal to dL,
    availableA is equal to FALSE,
    availableL is equal to FALSE.
  Otherwise, if dA is less then dL, ctxInc is set equal to 1.
  Otherwise, ctxInc is set equal to 0.]]

5.7. Embodiment 7

The working draft can be changed as below.
7.3.10.11 Residual Coding Syntax

| residual_ts_coding( x0, y0, log2TbWidth, log2TbHeight, cIdx ) { | Descriptor |
|---|---|
|   log2SbW = ( Min( log2TbWidth, log2TbHeight) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2Tb Width | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff = 1 << ( log2SbW + log2SbH ) | |
|   lastSubBlock = ( 1 << ( log2TbWidth + log2TbHeight − ( log2SbW + log2SbH ) ) ) − 1 | |
|   inferSbCbf = 1 | |
|   RemCcbs = ( ( 1 << ( log2TbWidth + log2TbHeight ) ) * 7 ) >> 2 | |
|   for( i = 0; i <= lastSubBlock; i++ ) { | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     if( i != lastSubBlock \|\| !inferSbCbf ) | |
|       sb_coded_flag[ xS ][ yS ] | ae(v) |
|     if( sb_coded_flag[ xS ][ yS ] && i < lastSubBlock ) | |
|       inferSbCbf = 0 | |
|     /* First scan pass */ | |
|     inferSbSigCoeffFlag = 1 | |
|     lastScanPosPass1 = −1 | |
|     for( n = 0; n <= numSbCoeff − 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( sb_coded_flag[ xS ][ yS ] && ( n != numSbCoeff − 1 \|\| !inferSbSigCoeffFlag ) ) { | |
|         sig_coeff_flag[ xC ][ yC ] | ae(v) |
|         RemCcbs− − | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         RemCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         RemCcbs− − | |
|         if( abs_level_gtx_flag[ n ][ 0 ] ) { | |

| residual_ts_coding( x0, y0, log2TbWidth, log2TbHeight, cIdx ) { | Descriptor |
|---|---|
|         par_level_flag[ n ] | ae(v) |
|         RemCcbs− − | |
|       } | |
|     } | |
|     AbsLevelPassl[ xC ][ yC ] = | |
|         sig_coeff_flag[ xC ][ yC ] + par_level_flag[ n ] + abs_level_gtx_flag[ n ][ 0 ] | |
|     lastScanPosPass1 = n | |
|   } | |
|  /* Greater than X scan pass (numGtXFlags=5) */ | |
|   lastScanPosPass2 = −1 | |
|   for( n = 0; n <= numSbCoeff − 1 && RemCcbs >= 4; n++ ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     AbsLevelPass2[ xC ][ yC ] = AbsLevelPassl[ xC ][ yC ] | |
|     for( j − 1; j < 5; j++ ) { | |
|       if( abs_level_gtx_flag [ n ][ j − 1 ] ) { | |
|         abs_level_gtx_flag[ n ][ j ] | ae(v) |
|         RemCcbs− − | |
|       } | |
|     AbsLevelPass2[ xC ][ yC ] += 2 * abs_level_gtx_flag[ n ][ j ] | |
|     } | |
|     lastScanPosPass2 = n | |
|   } | |
|  /* remainder scan pass */ | |
|   _RemCcbs− −_ | |
|   for( n = 0; n <= numSbCoeff − 1; n++ ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if (n <= lastScanPosPass2 && AbsLevelPass2[ xC ][ yC ] >= 10 ) || | |
|       ( n > lastScanPosPass2 && n <= lastScanPosPass1 && AbsLevelPass1[ xC ][ yC ] >= 2 ) | |
|       ( n > lastScanPosPass1 && sb_coded_flag[ xS ][ yS ] ) ) | |
|       abs_remainder[ n ] | ae(v) |
|     if( n <= lastScanPosPass2 ) | |
|       AbsLevel[ xC ][ yC ] = AbsLevelPass2[ xC ][ yC ] + 2 * abs_remainder[ n ] | |
|     else if(n <= lastScanPosPass1 ) | |
|       AbsLevel[ xC ][ yC ] = AbsLevelPass1[ xC ][ yC ] + 2 * abs_remainder[ n ] | |
|     else { /* bypass */ | |
|       AbsLevel[ xC ][ yC ] = abs_remainder[ n ] | |
|       if( abs_remainder_n ] ) | |
|         coeff_sign_flag[ n ] | ae(v) |
|     } | |
|     if( BdpcmFlag[ x0 ][ y0 ][ cIdx ] == 0 && n <= lastScanPosPass1 ) | |
| { | |
|       absLeftCoeff = xC > 0 ? AbsLevel[ xC − 1 ][ yC ] ) : 0 | |
|       absAboveCoeff = yC > 0 ? AbsLevel[ xC ][ yC − 1 ] ) : 0 | |
|       predCoeff = Max( absLeftCoeff, absAboveCoeff ) | |
|       if( AbsLevel[ xC ][ yC ] == 1 && predCoeff > 0 ) | |
|         AbsLevel[ xC ][ yC ] = predCoeff | |
|       else if( AbsLevel[ xC ][ yC ] > 0 && AbsLevel[ xC ][ yC ] <= predCoeff ) | |
|         AbsLevel[ xC ][ yC ]− − | |
|     } | |
|   } | |
|   TransCoeffLevel[ x0 ][ y0 ][ cIdx ][ xC ][ yC ] = (1 − 2 * coeff_sign_flag[ n ] ) * AbsLevel[ xC ][ yC ] | |
|   } | |
| } | |

TABLE 131

Assignment of ctxInc to syntax elements with context coded bins

| Syntax element | binIdx | | | | | |
|---|---|---|---|---|---|---|
| | 0 | 1 | 2 | 3 | 4 | >=5 |
| coeff_sign_flag[ ] transform_skip_flag[ x0 ][ y0 ][ cIdx ] = = 0 \|\| RemCcbs ≤ 3 [[= = 0]] \|\| slice_ts_residual_coding_disabled_flag | bypass | na | na | na | na | na |
| coeff_sign_flag[ ] transform_skip_flag[ x0 ][ y0 ][ cIdx ] = = 1 && RemCcbs >= [[0]]3 && !slice_ts_residual_coding_disabled_flag | 0 . . . 5 (clause 9.3.4.2.10) | na | na | na | na | na |

5.8. Embodiment 8

The working draft can be changed as below.
7.3.10.11 Residual Coding Syntax

| residual_ts_coding( x0, y0, log2TbWidth, log2TbHeight, cIdx ) { | Descriptor |
|---|---|
|   log2SbW = ( Min( log2TbWidth, log2TbHeight) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff = 1 << ( log2SbW + log2SbH ) | |
|   lastSubBlock = ( 1 << (log2TbWidth + log2TbHeight − ( log2SbW + log2SbH ) ) ) − 1 | |
|   inferSbCbf = 1 | |
|   RemCcbs = ( ( 1 << ( log2TbWidth + log2TbHeight ) ) * 7 ) >> 2 | |
|   for( i =0; i <= lastSubBlock; i++ ) { | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     if( i != lastSubBlock \|\| !inferSbCbf ) | |
|       sb_coded_flag[ xS ][ yS ] | ae(v) |
|     if( sb_coded_flag[ xS ][ yS ] && i < lastSubBlock ) | |
|       inferSbCbf = 0 | |
|     /* First scan pass */ | |
|     inferSbSigCoeffFlag = 1 | |
|     lastScanPosPass1 = −1 | |
|     for( n = 0; n <= numSbCoeff − 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( sb_coded_flag[ xS ][ yS ] && (n != numSbCoeff − 1 \|\| !inferSbSigCoeffFlag ) ) { | |
|         sig_coeff_flag[ xC ][ yC ] | ae(v) |
|         RemCcbs− − | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         RemCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         RemCcbs− − | |
|         if( abs_level_gtx_flag[ n ][ 0 ] ) { | |
|           par_level_flag[ n ] | ae(v) |
|           RemCcbs− − | |
|         } | |
|       } | |
|       AbsLevelPass1[ xC ][ yC ] = sig_coeff_flag[ xC ][ yC ] + par_level_flag[ n ] + abs_level_gtx_flag[ n ][ 0 ] | |
|       lastScanPosPass1 = n | |
|     } | |
|     /* Greater than X scan pass (numGtXFlags=5) */ | |
|     lastScanPosPass2 = −1 | |

| residual_ts_coding( x0, y0, log2TbWidth, log2TbHeight, cIdx ) { | Descriptor |
|---|---|
|     for( n = 0; n <= numSbCoeff − 1 && RemCcbs >= 4; n++ ) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ]<br>      AbsLevelPass2[ xC ][ yC ] = AbsLevelPass1[ xC ][ yC ]<br>      for( j = 1; j < 5; j++ ) {<br>        if( abs_level_gtx_flag [ n ][ j − 1 ] ) {<br>          abs_level_gtx_flag[ n ][ j ] | ae(v) |
|           RemCcbs− −<br>        }<br>        AbsLevelPass2[ xC ][ yC ] + = 2 * abs_level_gtx_flag[ n ][ j ]<br>      }<br>      lastScanPosPass2 = n<br>    }<br>    /* remainder scan pass */<br>    RemCcbs = 0<br>    for( n = 0; n <= numSbCoeff − 1; n++ ) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ]<br>      if ( n <= lastScanPosPass2 && AbsLevelPass2[ xC ][ yC ] >= 10 ) \|\|<br>        ( n > lastScanPosPass2 && n <= lastScanPosPass1 &&<br>          AbsLevelPass1[ xC ][ yC ] >= 2 ) \|\|<br>        ( n > lastScanPosPass1 && sb_coded_flag[ xS ][ yS ] ) )<br>        abs_remainder[ n ]<br>      if( n <= lastScanPosPass2 )<br>        AbsLevel[ xC ][ yC ] = AbsLevelPass2[ xC ][ yC ] + 2 * abs_remainder[ n ]<br>      else if(n <= lastScanPosPass1 )<br>        AbsLevel[ xC ][ yC ] = AbsLevelPass1[ xC ][ yC ] + 2 * abs_remainder[ n ]<br>      else { /* bypass */<br>        AbsLevel[ xC ][ yC ] = abs_remainder[ n ]<br>        if( abs_remainder[ n ] )<br>          coeff_sign_flag[ n ] | ae(v)<br><br><br><br><br><br><br><br><br><br><br><br>ae(v)<br><br><br><br><br><br>ae(v) |
|       }<br>      if( BdpcmFlag[ x0 ][ y0 ][ cIdx ] = = 0 && n <= lastScanPosPass1 )<br>    {<br>        absLeftCoeff = xC > 0 ? AbsLevel[ xC − 1 ][ yC ] ) : 0<br>        absAboveCoeff = yC > 0 ? AbsLevel[ xC ][ yC − 1 ] ) : 0<br>        predCoeff= Max( absLeftCoeff, absAboveCoeff )<br>        if( AbsLevel[ xC ][ yC ] = = 1 && predCoeff > 0 )<br>          AbsLevel[ xC ][ yC ] = predCoeff<br>        else if( AbsLevel[ xC ][ yC ] > 0 && AbsLevel[ xC ][ yC ] <= predCoeff )<br>          AbsLevel[ xC ][ yC ]− −<br>      }<br>    }<br>    TransCoeffLevel[ x0 ][ y0 ][ cIdx ][ xC ][ yC ] = (1 − 2 * coeff_sign_flag[ n ] ) * AbsLevel[ xC ][ yC ]<br>  }<br>} | |

TABLE 131

Assignment of ctxInc to syntax elements with context coded bins

| Syntax element | binIdx | | | | | |
|---|---|---|---|---|---|---|
| | 0 | 1 | 2 | 3 | 4 | >=5 |
| coeff_sign_flag[ ] transform_skip_flag[ x0 ][ y0 ][ cIdx ] = = 0 \|\| RemCcbs = = 0 \|\| slice_ts_residual_coding_disabled_flag | bypass | na | na | na | na | na |
| coeff_sign_flag[ ] transform_skip_flag[ x0 ][ y0 ][ cIdx ] = = 1 && RemCcbs >[[=]] 0 | 0...5 (clause 9.3.4.2.10) | na | na | na | na | na |
| && !slice_ts_residual_coding_disabled_flag | | | | | | |

Figure 12:
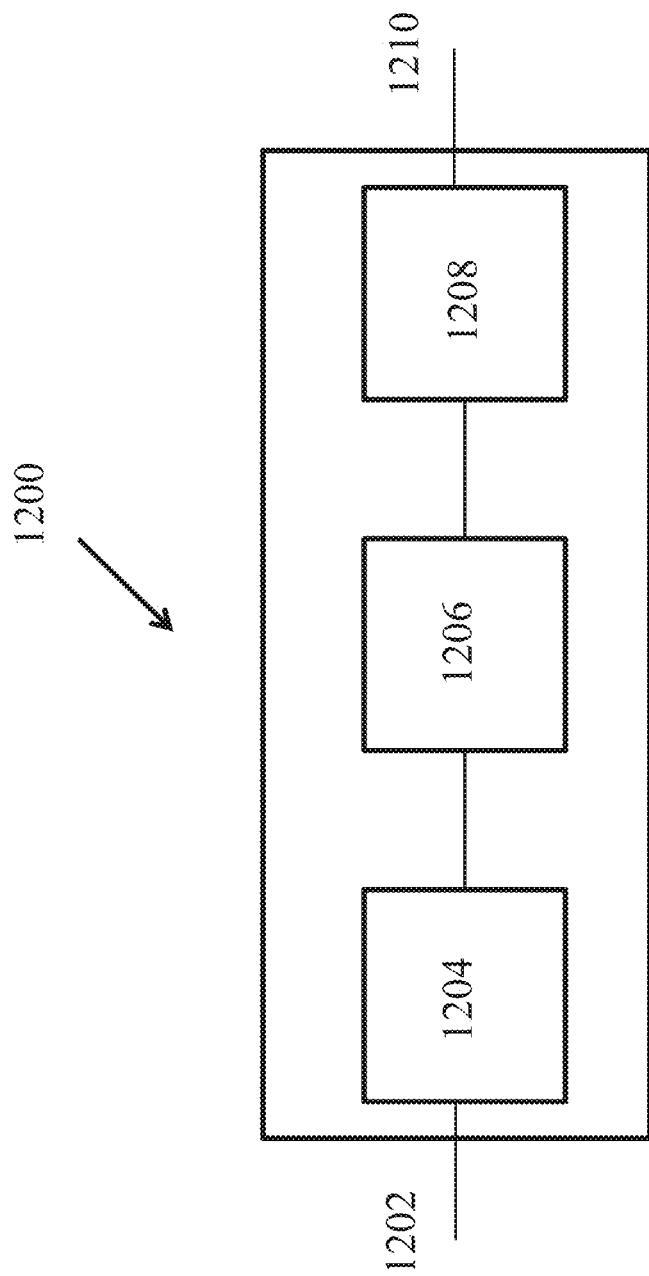
FIG. 12 is a block diagram of an example video processing system.

FIG. 12 is a block diagram showing an example video processing system 1200 in which various techniques disclosed herein may be implemented. Various implementations may include some or all of the components of the system 1200. The system 1200 may include input 1202 for receiving video content. The video content may be received in a raw or uncompressed format, e.g., 8 or 10 bit multi-component pixel values, or may be in a compressed or encoded format. The input 1202 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1200 may include a coding component 1204 that may implement the various coding or encoding methods described in the present disclosure. The coding component 1204 may reduce the average bitrate of video from the input 1202 to the output of the coding component 1204 to produce a coded representation of the video. The coding techniques are therefore sometimes called video compression or video transcoding techniques. The output of the coding component 1204 may be either stored, or transmitted via a communication connected, as represented by the component 1206. The stored or communicated bitstream (or coded) representation of the video received at the input 1202 may be used by the component 1208 for generating pixel values or displayable video that is sent to a display interface 1210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 13:
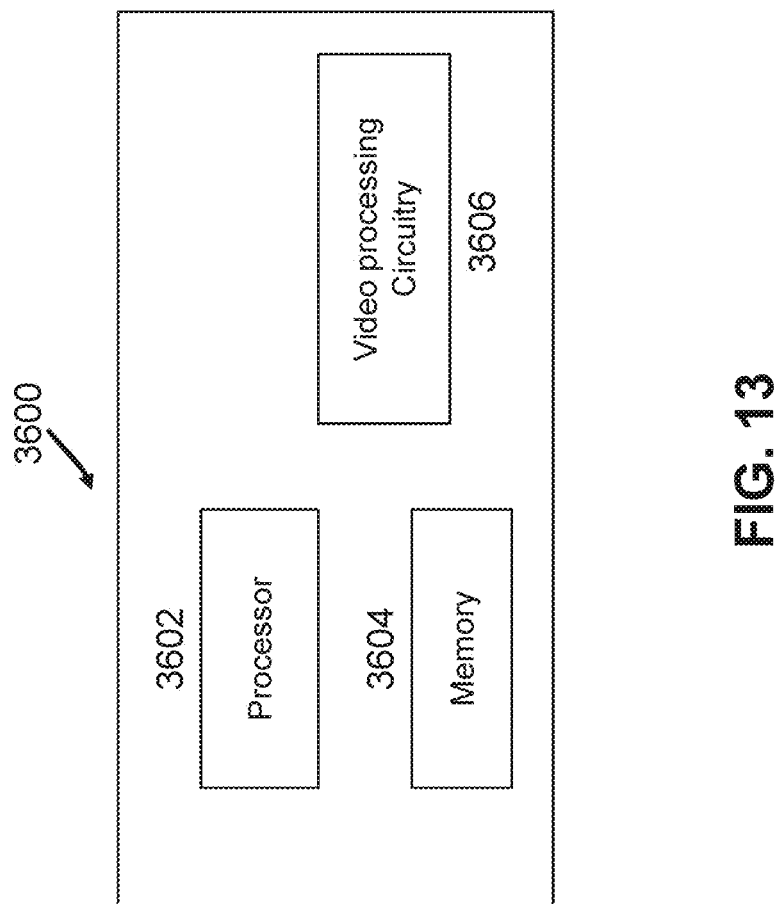
FIG. 13 shows an example of a video processing apparatus.

FIG. 13 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and techniques described herein. The video processing hardware 3606 may be used to implement, in hardware circuitry, some techniques described in the present disclosure.

Figure 15:
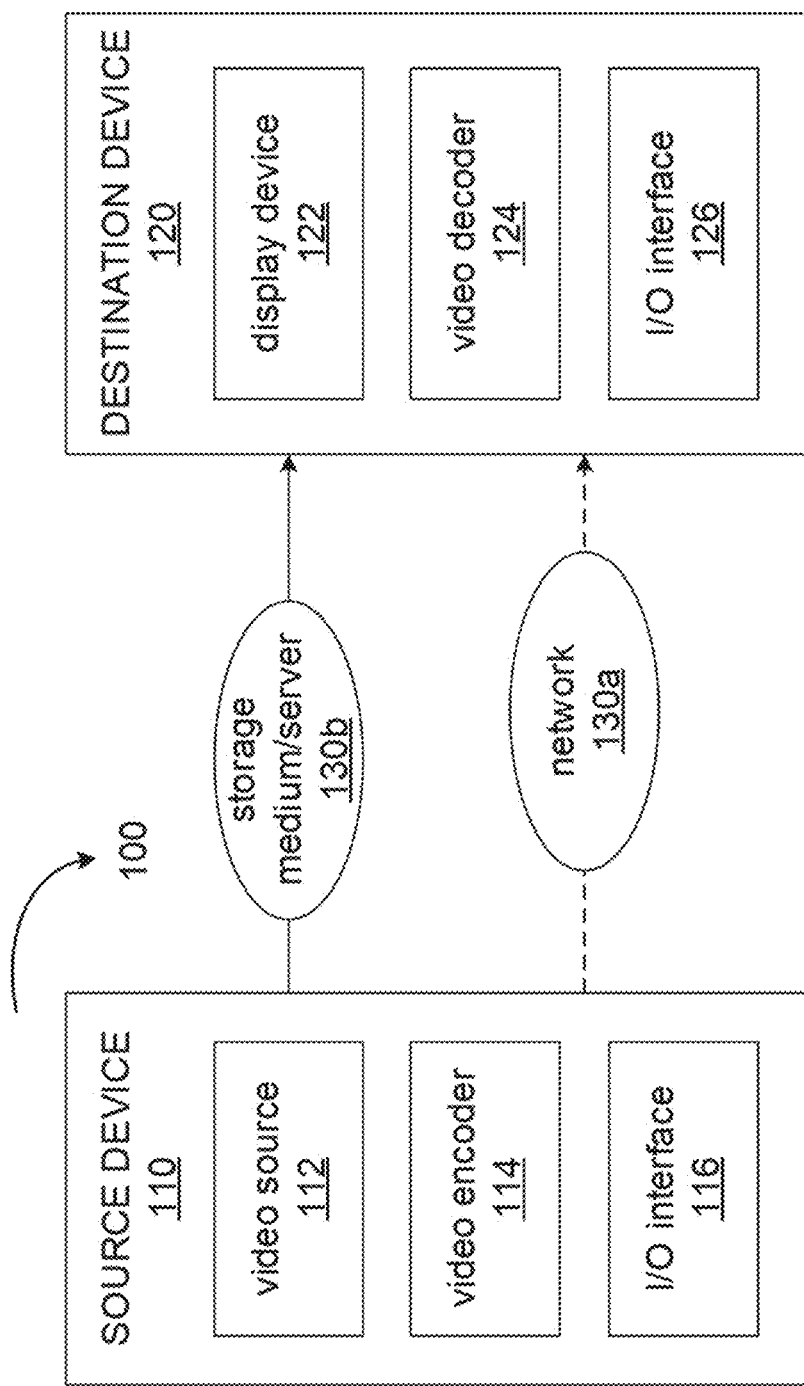
FIG. 15 is a block diagram that illustrates a video coding system in accordance with some embodiments of the present disclosure.

FIG. 15 is a block diagram that illustrates an example video coding system 100 that may utilize the techniques of this disclosure.

As shown in FIG. 15, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 16:
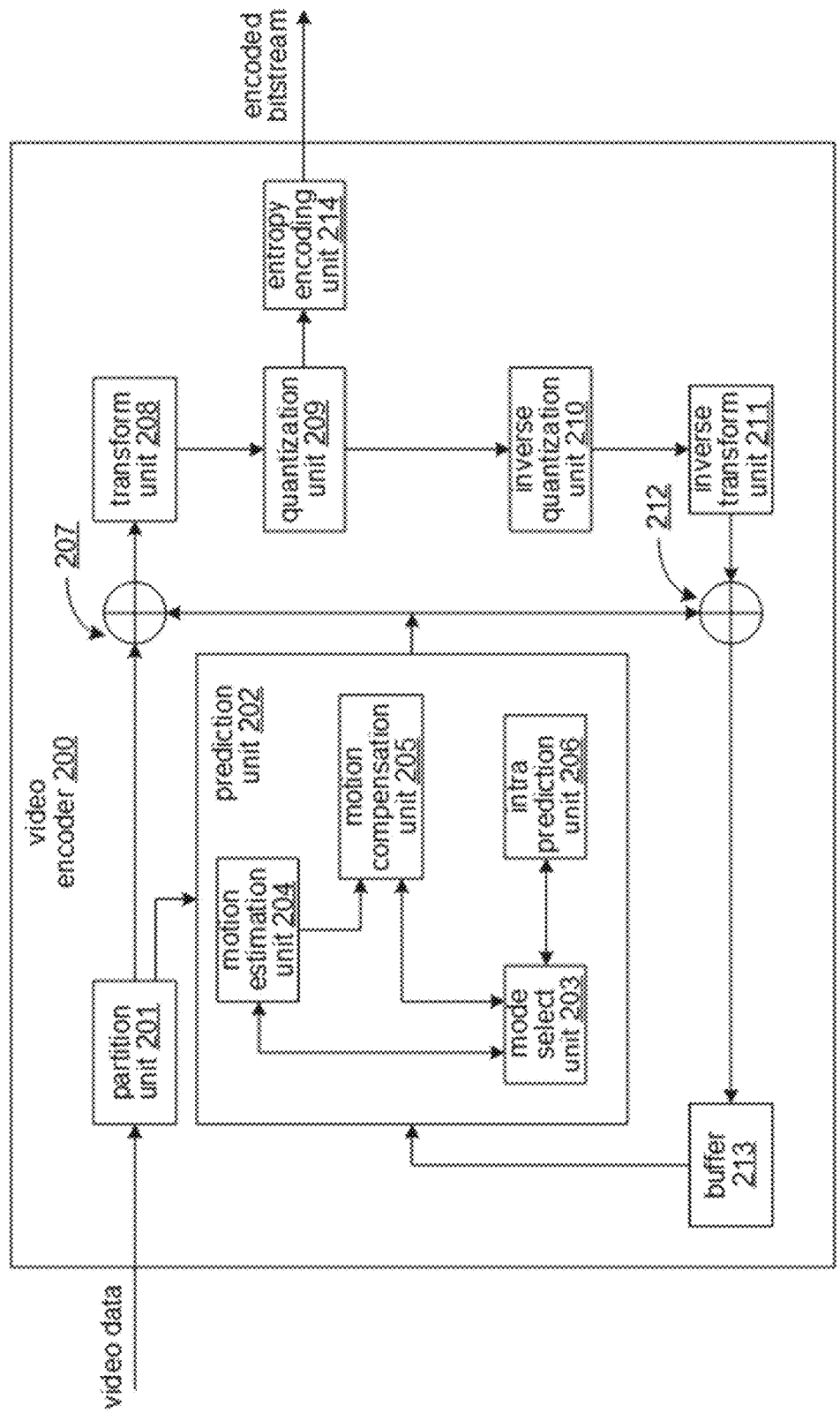
FIG. 16 is a block diagram that illustrates an encoder in accordance with some embodiments of the present disclosure.

FIG. 16 is a block diagram illustrating an example of video encoder 200, which may be video encoder 114 in the system 100 illustrated in FIG. 15.

Video encoder 200 may be configured to perform any or all of the techniques of this disclosure. In the example of FIG. 16, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 16 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 17:
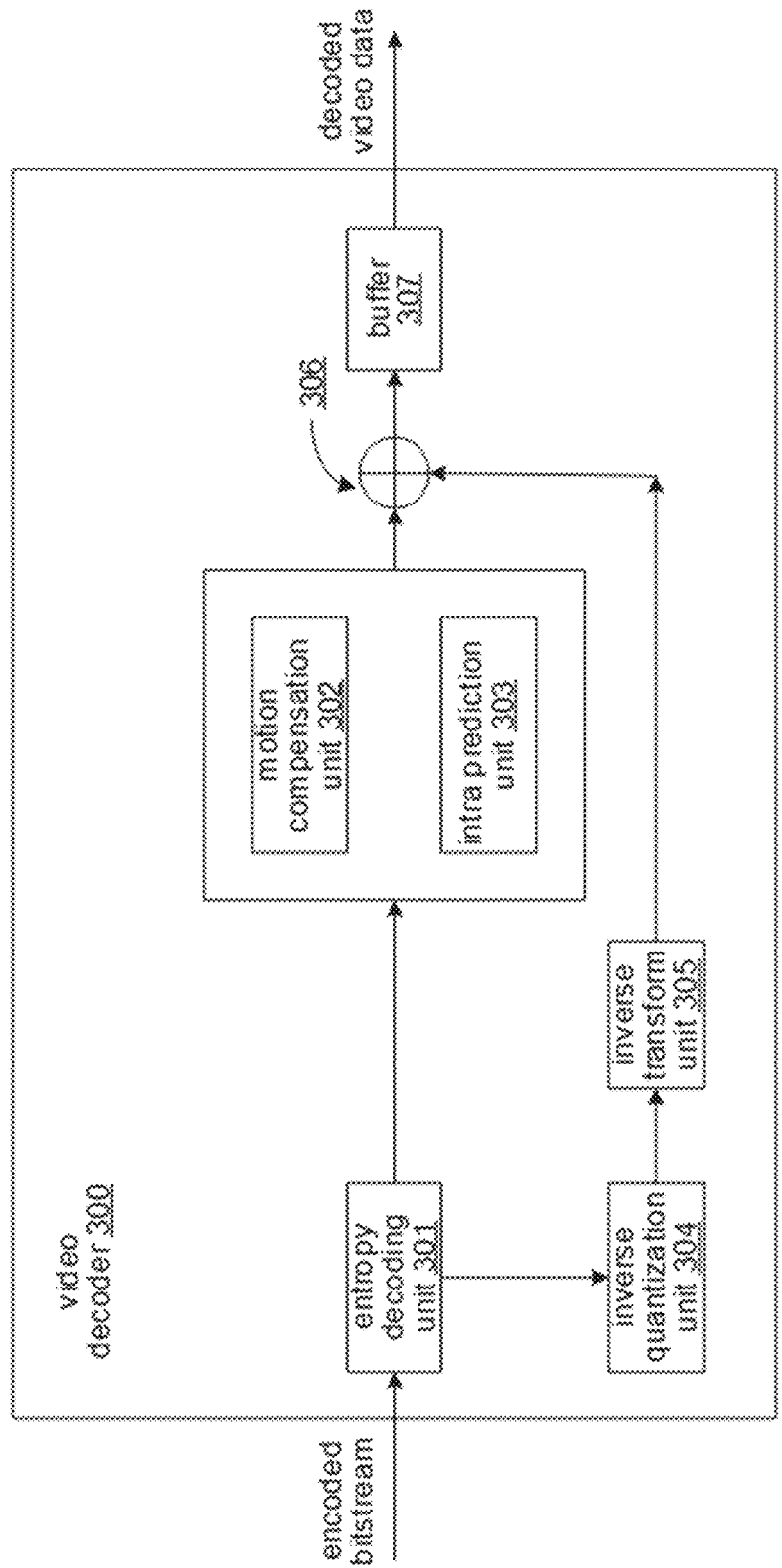
FIG. 17 is a block diagram that illustrates a decoder in accordance with some embodiments of the present disclosure.

FIG. 17 is a block diagram illustrating an example of video decoder 300 which may be video decoder 124 in the system 100 illustrated in FIG. 15.

The video decoder 300 may be configured to perform any or all of the techniques of this disclosure. In the example of FIG. 17, the video decoder 300 includes a plurality of functional components. The techniques described in this disclosure may be shared among the various components of the video decoder 300. In some examples, a processor may be configured to perform any or all of the techniques described in this disclosure.

In the example of FIG. 17, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 16).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, e.g., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 14:
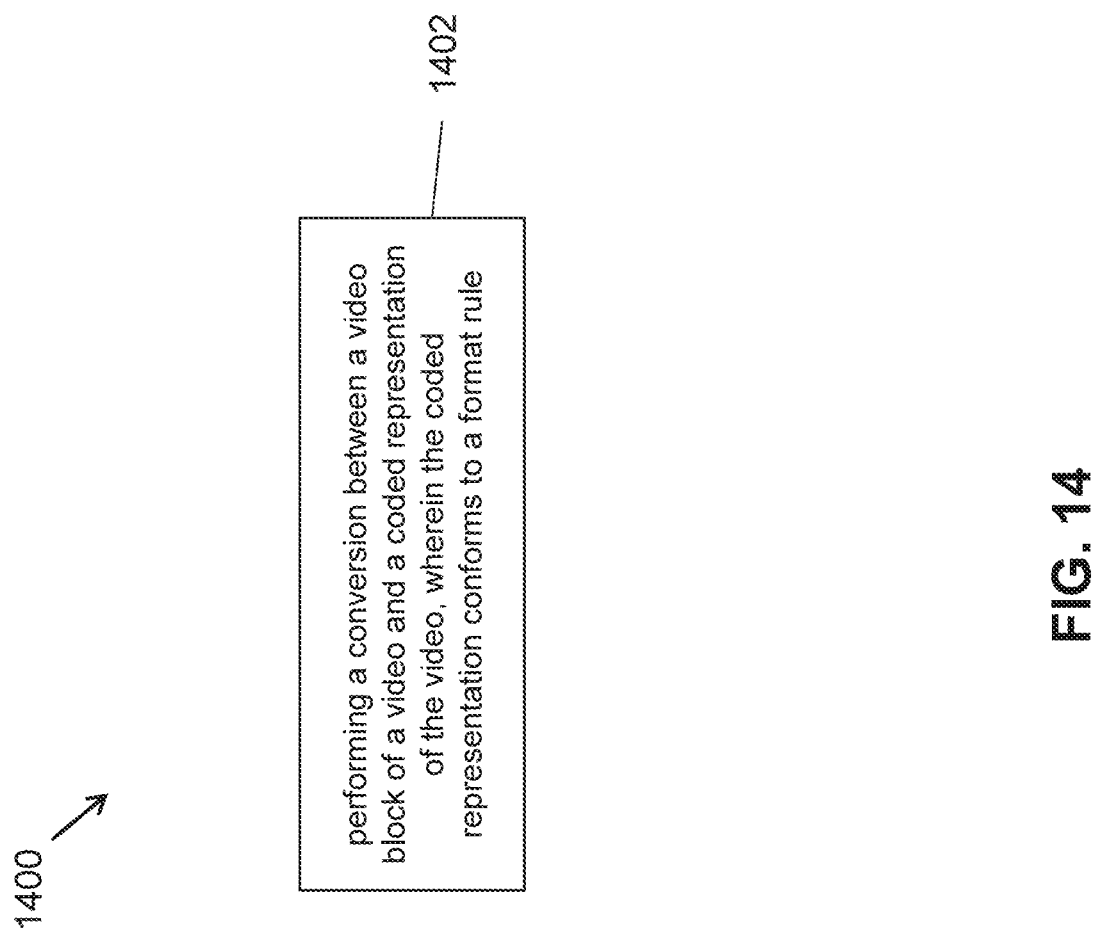
FIG. 14 is a flowchart for an example of a video processing method.

1. A video processing method (e.g., method 1400 shown in FIG. 14), comprising: performing a conversion between a video block of a video and a coded representation of the video, wherein the coded representation conforms to a format rule, wherein the conversion is based on an adaptive motion vector difference resolution (AMVR) tool in which a representation of a motion vector or a motion vector difference or a motion vector predictor for the video block is represented in the coded representation using an adaptive resolution; wherein the format rule specifies to represent use of the adaptive resolution in the coded representation by context modeling that is dependent on a coded information of the video block or a neighboring block of the video block.

2. The method of solution 1, wherein the coded information comprises use of an intra block copy mode.

3. The method of solution 1, wherein the coded information comprises use of an affine AMVR mode or a non-affine and non-intra block copy mode, a bi-prediction or a uni-prediction mode.

4. The method of any of solutions 1-3, wherein the coded information comprises dimensions of the video block.

The following solutions show example embodiments of techniques discussed in the previous section (e.g., item 2).

5. A video processing method, comprising: performing a conversion between a video block of a video and a coded representation of the video, wherein the coded representation conforms to a format rule, wherein the conversion is based on an adaptive motion vector difference resolution (AMVR) tool in which a representation of a motion vector or a motion vector difference or a motion vector predictor for the video block is represented in the coded representation using an adaptive resolution; wherein the format rule specifies how to represent use of the adaptive resolution in the coded representation by context modeling such that contexts used for coding a first bin and a second bin for an index of a precision used by the AMVR tool.

6. The method of solution 5, wherein the format rule specifies to use the first bin and the second bin are coded using a same context.

7. The method of solution 5, wherein the format rule specifies that the second bin is coded in the coded representation if and only if a non-affine and a non-intra block copy mode is used for representing the video block in the coded representation.

The following solutions show example embodiments of techniques discussed in the previous section (e.g., items 3 to 8).

8. A video processing method, comprising: performing a conversion between a video comprising one or more video pictures comprising a plurality of video blocks and a coded representation of the video, wherein the coded representation conforms to a format rule for signaling information about adaptive motion vector difference resolution (AMVR) coding of one or more video blocks; wherein the format rule specifies that a same context is used for coding a bin of an AMVR precision index of a first video block coded using a first coding mode and a bin of an AMVR precision index of a second video block coded using a second coding mode.

9. The method of solution 8, wherein the first coding mode corresponds to an intra block copy mode and the second coding mode corresponds to inter-coding, and wherein the bin of the first video block is a first bin of an AMVR precision index and the bin of the second video block is a second bin of a corresponding AMVR precision index.

10. The method of solution 8, wherein the first coding mode corresponds to an intra block copy mode and the second coding mode corresponds to inter-coding, and wherein the bin of the first video block is a first bin of an AMVR precision index and the bin of the second video block is a first bin of a corresponding AMVR precision index.

11. The method of solution 8, wherein the first coding mode corresponds to an intra block copy mode and the second coding mode corresponds to inter-coding, and wherein the bin of the first video block is a first bin of an AMVR precision index and the bin of the second video block is a first bin of a corresponding AMVR precision index.

12. The method of solution 8, wherein the first coding mode corresponds to an intra block copy mode and the second coding mode corresponds to affine coding, and wherein the bin of the first video block is a first bin of an AMVR precision index and the bin of the second video block is a first bin of a corresponding AMVR precision index.

13. The method of solution 8, wherein format rule further specifies to use a same context for coding all bins of the first video block, the second video block and a third video block having an intra block copy mode, an affine mode and an inter coding mode.

14. The method of solution 8, wherein format rule further specifies to use different context for coding first bins of the first video block, the second video block and a third video block having an intra block copy mode, an affine mode and an inter coding mode and a same context for coding a second bin of the first video block, the second video block and the third video block.

The following solutions show example embodiments of techniques discussed in the previous section (e.g., item 9).

15. The method of any of solutions 1-14, wherein the format rule further specifies that at least one context used for coding a precision value is same as that used for coding a flag indicative of applicability of the AMVR tool.

The following solutions show example embodiments of techniques discussed in the previous section (e.g., items 10-11).

16. A video processing method, comprising: performing a conversion between video block of a video and a coded representation of the video, wherein the video block is split into one or more vertical and/or one or more horizontal partitions, wherein the coded representation conforms to a format rule that specifies context-based coding of splitting information for the video block.

17. The method of solution 16, wherein the format rule specifies that a context modeling for a syntax element indicating the splitting information is dependent on a number of allowed vertical splits for the video block and/or a number of allowed horizontal splits for the video block.

18. The method of solution 17, wherein the format rule is dependent on whether the number of allowed vertical splits for the video block is greater than the number of allowed horizontal splits for the video block.

19. The method of any of solutions 17-18, wherein the format rule specifies to use N contexts for coding the syntax element, wherein N is based on a dimension of the video block or a dimension of a neighboring video block.

The following solutions show example embodiments of techniques discussed in the previous section (e.g., item 12).

20. The method of any of solutions 16-19, wherein the format rule specifies to use a single context for coding a flag indicative of applicability of a vertical split to the video block.

The following solutions show example embodiments of techniques discussed in the previous section (e.g., items 13, 17).

21. A video processing method, comprising: performing a conversion between video block of a video and a coded representation of the video, wherein the coded representation conforms to a format rule, wherein the format rule specifies a coding condition used to decide between using context coding or bypass coding for representing a sign of a transform coefficient.

22. The method of solution 21, wherein the coding condition corresponds to a number of remaining allowed context coded bins.

23. The method of solution 21, wherein the coding condition corresponds to a kind of transform used for conversion between the video block and the coded representation.

The following solutions show example embodiments of techniques discussed in the previous section (e.g., item 14).

24. A video processing method, comprising: performing a conversion between video block of a video and a coded representation of the video, wherein the coded representation conforms to a format rule, wherein the format rule specifies that at a beginning of a bypass coding for remaining syntax elements in a third or a remainder coefficient scan pass of the transform skip residual coding process, an operation is applied to a variable specifying the number of the remaining allowed context coded bins.

25. The method of any of solutions 1 to 24, wherein the conversion comprises encoding the video into the coded representation.

26. The method of any of solutions 1 to 24, wherein the conversion comprises decoding the coded representation to generate pixel values of the video.

27. A video decoding apparatus comprising a processor configured to implement a method recited in one or more of solutions 1 to 26.

28. A video encoding apparatus comprising a processor configured to implement a method recited in one or more of solutions 1 to 26.

29. A computer program product having computer code stored thereon, the code, when executed by a processor, causes the processor to implement a method recited in any of solutions 1 to 26.

30. A method, apparatus or system described in the present disclosure.

Figure 18:
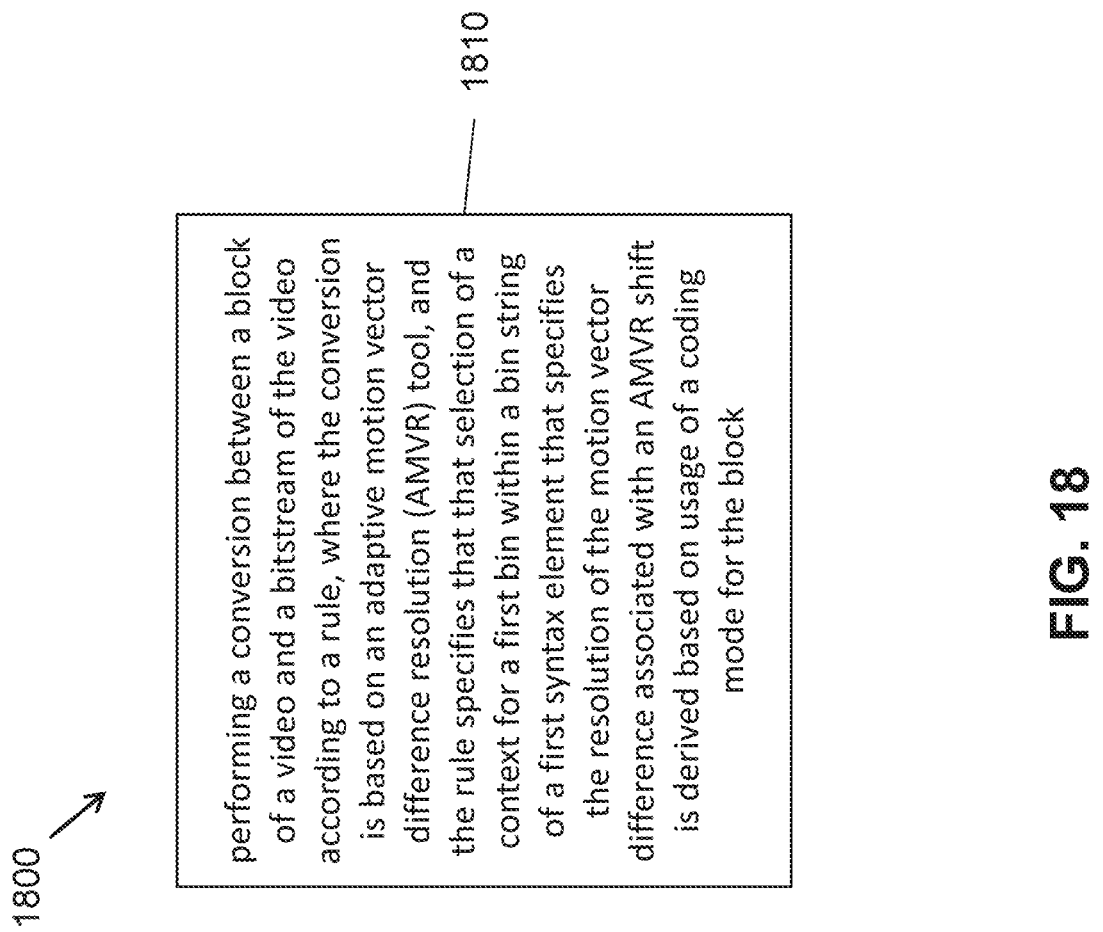
FIG. 18 is a flowchart representation of a video processing method in accordance with one or more embodiments of the present technology.

FIG. 18 is a flowchart representation of a video processing method 1800 in accordance with one or more embodiments of the present technology. The method 1800 includes, at operation 1810, performing a conversion between a block of a video and a bitstream of the video according to a rule. The conversion is based on an adaptive motion vector difference resolution (AMVR) tool, and the rule specifies that selection of a context for a first bin within a bin string of a first syntax element that specifies the resolution of the motion vector difference associated with an AMVR shift is derived based on usage of a coding mode for the block.

In some embodiments, the block is a coding unit. In some embodiments, the coding mode for the block is one of an affine inter mode, an intra block copy mode, or a normal inter mode which is a non-affine inter mode. In some embodiments, multiple contexts corresponding to different coding modes are applicable to the first bin. In some embodiments, the multiple contexts include three contexts. In some embodiments, each coding mode corresponds to a single context.

In some embodiments, a first context for the first bin is assigned a first value in case the block is coded using the IBC mode, and at least one context different from the first context is applicable to the first bin for at least one inter coding mode in case the block is not coded using the IBC mode. In some embodiments, a second context for the first bin is assigned a second value in case the block is coded using an affine inter mode, and a third context for the first bin is assigned a third value in case the block is coded using a normal inter mode which is a non-affine inter mode. The second value and the third value are different from each other.

In some embodiments, a context of a second bin of the bin string is same as one or more of contexts used for the first bin. In some embodiments, a second bin of the bin string is coded with a single context value. In some embodiments, the same context is selected for the first bin of the bin string for a first block which is coded using an IBC mode and the second bin of the bin string for a second block which is coded using a normal inter mode which is a non-affine inter mode.

In some embodiments, in case the block is coded using an IBC mode or an affine inter mode, the bin string consists of the first bin. In case the block is coded using a normal inter mode which is a non-affine inter mode, the bin string further comprises a second bin. In some embodiments, at least one of the multiple contexts applicable to the first bin is same as at least one context selected for a second syntax element that specifies whether the resolution of the motion vector difference is ¼ of a luma sample or is specified by the first syntax element. In some embodiments, in case the block is coded using the IBC mode, the context for the first syntax element that specifies the resolution of the motion vector difference is same as the context selected for the second syntax element that specifies whether the resolution of the motion vector difference is ¼ of a luma sample or is specified by the first syntax element. In some embodiments, in case the block is not coded using the IBC mode or the affine mode, the context for the first syntax element that specifies the resolution of the motion vector difference is same as the context selected for the second syntax element that specifies whether the resolution of the motion vector difference is ¼ of a luma sample or is specified by the first syntax element. In some embodiments, the context for the first bin within the bin string is assigned a value of CtxM, and a context for the second bin with the bin string is assigned a value of CtxQ, where CtxM=CtxQ. In some embodiments, a different context is selected for the second bin as compared to the first bin.

In some embodiments, a first context for the first bin in case the block is coded in the IBC mode, a second context for the first bin in case the block is coded using the affine mode, and a third context for the first bin in case the block is coded using neither the IBC mode nor the affine mode are same. In some embodiments, a first context for the first bin in case the block is coded in the IBC mode and a second context for the first bin in case the block is coded using neither the IBC mode nor the affine mode are same are same. In some embodiments, a third context for the first bin in case the block is coded using the affine mode is different from the first context and the second context. In some embodiments, a first context for the first bin in case the block is coded in the IBC mode and a second context for the first bin in case the block is coded using the affine mode are same. In some embodiments, contexts for all bins within the bin string in case the block is coded in the IBC mode, contexts for all bins within the bin string in case the block is coded using the affine mode, and contexts for all bins within the bin string in case the block is coded using neither the IBC mode nor the affine mode are same.

In some embodiments, the AMVR tool is a coding tool in which a resolution of a motion vector difference is adaptively adjusted on a block-by-block basis.

FIG. 19 is a flowchart representation of a video processing method 1900 in accordance with one or more embodiments of the present technology. The method 1900 includes, at operation 1910, performing a conversion between a current block of a video and a bitstream of the video according to a rule. The rule specifies that selection of a context for coding a syntax element specifying whether the block is split horizontally or vertically is based on a number of allowed vertical splits and a number of allowed horizontal splits. The number of allowed vertical splits includes a number of allowed binary vertical splits and a number of allowed ternary vertical splits, and the number of allowed horizontal splits includes a number of allowed binary horizontal splits and a number of allowed ternary horizontal splits.

In some embodiments, the block is a coding unit. In some embodiments, the content is selected by comparing the number of allowed vertical splits with the number of allowed horizontal splits. In some embodiments, the context is selected from a first context set in case the number of allowed vertical splits is greater than the number of allowed horizontal splits. In some embodiments, the context is selected from a second context set in case the number of allowed vertical splits is less than the number of allowed horizontal splits. In some embodiments, each of the first context set and the second context set includes a single context. In some embodiments, the single context in the first context set has a value of 4. In some embodiments, the single context in the second context set has a value of 3.

In some embodiments, the context is selected from a third context set in case the number of allowed vertical splits is same the number of allowed horizontal splits. In some embodiments, the third context set includes multiple contexts. In some embodiments, the third context set includes a third context having a value of 0, a fourth context having a value of 1, and a fifth context having a value of 2.

In some embodiments, the selection of the context from the third context set is further based on (1) availability of a first neighboring block located above the current block and a second neighboring block located to the left of the current block, (2) a dimension of the current block, and/or (3) dimensions of the neighboring blocks. In some embodiments, the context is assigned to a value of CtxD in case (1) either the first neighboring block located above the current block or the second neighboring block located to the left of the current block is unavailable, or (2) dA is equal to dL, where dA represents a width of the current block divided by a width of the first neighboring block located above the current block, and where dL represents a height of the current block divided by a height of the second neighboring block located to the left of the current block. In some embodiments, the context is assigned to a value of CtxE in case dA is less than dL, where dA represents a width of the current block divided by a width of the first neighboring block located above the current block, and where dL represents a height of the current block divided by a height of the second neighboring block located to the left of the current block. In some embodiments, the context is assigned to a value of CtxF in case dA is greater than dL, where dA represents a width of the current block divided by a width of the first neighboring block located above the current block, and where dL represents a height of the current block divided by a height of the second neighboring block located to the left of the current block.

In some embodiments, contexts in the first context set, the second context set, and the third context set are different from each other.

FIG. 20 is a flowchart representation of a video processing method 2000 in accordance with one or more embodiments of the present technology. The method 2000 includes, at operation 2010, performing a conversion between a current block of a video and a bitstream of the video according to a rule. The rule specifies that whether to use context coding or bypass coding for a syntax element specifying a sign of a transform coefficient level is based on a number of remaining allowed context coded bins or a type of transform used for the current block.

In some embodiments, context coding is used for the syntax element in a transform skip residual coding process for the current block in case the number of remaining allowed context coded bins is greater than or equal to a threshold. In some embodiments, bypass coding is used for the syntax element in a transform skip residual coding process for the current block in case the number of remaining allowed context coded bins is smaller than a threshold. In some embodiments, the threshold is 0 or 3.

In some embodiments, bypass coding is used for the syntax element in case the number of remaining allowed context coded bins is smaller than or equal to N. In some embodiments, context coding is used for the syntax element in case the number of remaining allowed context coded bins is greater than or equal to N. In some embodiments, the number of remaining allowed context coded bins is modified to be less than or equal to N before processing remaining absolute values of transform coefficient levels in the conversion. In some embodiments, N is 0, 3, or 4. In some embodiments, N is an integer number that is based on a characteristic of the current block. In some embodiments, the characteristic of the current block comprises an indication in a sequence parameter set, a video parameter set, a picture parameter set, a picture header, a slice header, a tile group header, a large coding unit row, a group of large coding units, a large coding unit, or a coding unit. In some embodiments, the characteristic of the current block comprises a dimension or a shape of the current block or a neighboring block of the current block. In some embodiments, the characteristic of the current block comprises an indication of a color format of the video. In some embodiments, the characteristic of the current block comprises an indication indicating whether a separate or dual coding tree structure is used for the conversion. In some embodiments, the characteristic of the current block comprises a slice type or a picture type. In some embodiments, the characteristic of the current block comprises a number of color components of the video.

In some embodiments, context coding of the syntax element is based on the number of remaining allowed context coded bins. In some embodiments, a variable specifying the number of remaining allowed context coded bins is modified at a beginning of the bypass coding of remaining syntax elements in a third or remaining coefficient scan pass of a transform skip residual coding process. In some embodiments, the variable is set to a fixed value of 0. In some embodiments, the variable is decremented by one. In some embodiments, the current block comprises a transform block or a transform-skip block including or excluding a block-based Delta Pulse Code Modulation coded block.

In some embodiments, whether or how to apply the method is indicated by at a sequence level, a picture level, a slice level, or a tile group level. In some embodiments, an indication is included in a sequence header, a picture header, a sequence parameter set, a video parameter set, a decoder parameter set, decoding capability information, a picture parameter set, an adaptation parameter set, a slice header, or a tile group header. In some embodiments, whether or how to apply the method is based on coded information of the video.

In some embodiments, the conversion comprises encoding the video into the bitstream. In some embodiments, the conversion comprises decoding the video from the bitstream.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in the present disclosure can be implemented in digital electronic circuitry, or in computer software, firmware, or hardware, including the structures disclosed in the present disclosure and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the present disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A video processing method, comprising:
   performing a conversion between a first block of a video and a bitstream of the video according to a rule,
   wherein the conversion is based on an adaptive motion vector resolution (AMVR) tool,
   wherein the rule specifies that selection of a context increasement (ctxInc) for a first bin within a bin string of a first syntax element that specifies a resolution of motion vector difference associated with an AMVR shift is derived based on usage of a coding mode for the first block, and wherein the coding mode for the first block is one of an affine inter mode, an intra block copy (IBC) mode, or a normal inter mode which is a non-affine inter mode,
   wherein a first context increasement is assigned for the first bin in case the first block is coded using the IBC mode, a second context increasement is assigned for the first bin in case that the first block is coded using the affine inter mode, and a third context increasement is assigned for the first bin in case that the first block is coded using the normal inter mode, and
   wherein the first context increasement is equal to 1, the second context increasement is equal to 2, and the third context increasement is equal to 0.

2. The method of claim 1, wherein the first block is a coding unit.

3. The method of claim 1, wherein three different context increasements corresponding to the three different coding modes are applicable to the first bin, and each coding mode corresponds to a single context increasement.

4. The method of claim 1, wherein a same context increasement is used for the first bin of the bin string of the first syntax element for the first block in case that the first block is coded using the IBC mode and a second bin of the bin string of the first syntax element for a second block which is coded using the normal inter mode.

5. The method of claim 1, wherein a same context increasement is used for the first bin of the bin string of the first syntax element for the first block in case that the first block is coded using the IBC mode and a bin of a second syntax element for a third block that specifies whether the resolution of the motion vector difference is 1/4 of a luma sample or is specified by the first syntax element, and wherein the third block is coded using the affine inter mode.

6. The method of claim 1, wherein a same context increasement is used for the first bin of the bin string of the first syntax element for the first block in case that the first block is coded using the normal inter mode and a bin of a second syntax element for a fourth block that specifies whether the resolution of the motion vector difference is 1/4 of a luma sample or is specified by the first syntax element, and wherein the fourth block is not coded using the affine inter mode.

7. The method of claim 1, wherein in an initialization process, a value of a context index for the first syntax element is in a range from 0 to 2 in case that a context initialization type is a first type, the value of the context index for the first syntax element is in a range from 3 to 5 in case that the context initialization type is a second type, and the value of the context index for the first syntax element is in a range from 6 to 8 in case that the context initialization type is a third type.

8. The method of claim 1, wherein the conversion comprises encoding the video into the bitstream.

9. The method of claim 1, wherein the conversion comprises decoding the video from the bitstream.

10. An apparatus for processing video data comprising a processor and a non-transitory memory with instructions thereon, wherein the instructions upon execution by the processor, cause the processor to:
perform a conversion between a first block of a video and a bitstream of the video according to a rule,
wherein the conversion is based on an adaptive motion vector resolution (AMVR) tool,
wherein the rule specifies that selection of a context increasement (ctxInc) for a first bin within a bin string of a first syntax element that specifies a resolution of motion vector difference associated with an AMVR shift is derived based on usage of a coding mode for the first block, and wherein the coding mode for the first block is one of an affine inter mode, an intra block copy (IBC) mode, or a normal inter mode which is a non-affine inter mode,
wherein a first context increasement is assigned for the first bin in case the first block is coded using the IBC mode, a second context increasement is assigned for the first bin in case that the first block is coded using the affine inter mode, and a third context increasement is assigned for the first bin in case that the first block is coded using the normal inter mode, and wherein the first context increasement is equal to 1, the second context increasement is equal to 2, and the third context increasement is equal to 0.

11. The apparatus of claim 10, wherein the first block is a coding unit.

12. The apparatus of claim 10, wherein three different context increasements corresponding to the three different coding modes are applicable to the first bin, and each coding mode corresponds to a single context increasement.

13. The apparatus of claim 10, wherein a same context increasement is used for the first bin of the bin string of the first syntax element for the first block in case that the first block is coded using the IBC mode and a second bin of the bin string of the first syntax element for a second block which is coded using the normal inter mode;
wherein the same context increasement is used for the first bin of the bin string of the first syntax element for the first block in case that the first block is coded using the IBC mode and a bin of a second syntax element for a third block that specifies whether the resolution of the motion vector difference is 1/4 of a luma sample or is specified by the first syntax element, and wherein the third block is coded using the affine inter mode; or
wherein the same context increasement is used for the first bin of the bin string of the first syntax element for the first block in case that the first block is coded using the normal inter mode and a bin of the second syntax element for a fourth block that specifies whether the resolution of the motion vector difference is 1/4 of a luma sample or is specified by the first syntax element, and wherein the fourth block is not coded using the affine inter mode.

14. The apparatus of claim 10, wherein in an initialization process, a value of a context index for the first syntax element is in a range from 0 to 2 in case that a context initialization type is a first type, the value of the context index for the first syntax element is in a range from 3 to 5 in case that the context initialization type is a second type, and the value of the context index for the first syntax element is in a range from 6 to 8 in case that the context initialization type is a third type.

15. A non-transitory computer-readable storage medium storing instructions that cause a processor to:
perform a conversion between a first block of a video and a bitstream of the video according to a rule,
wherein the conversion is based on an adaptive motion vector resolution (AMVR) tool,
wherein the rule specifies that selection of a context increasement (ctxInc) for a first bin within a bin string of a first syntax element that specifies a resolution of motion vector difference associated with an AMVR shift is derived based on usage of a coding mode for the first block, and
wherein the coding mode for the first block is one of an affine inter mode, an intra block copy (IBC) mode, or a normal inter mode which is a non-affine inter mode,
wherein a first context increasement is assigned for the first bin in case the first block is coded using the IBC mode, a second context increasement is assigned for the first bin in case that the first block is coded using the affine inter mode, and a third context increasement is assigned for the first bin in case that the first block is coded using the normal inter mode, and
wherein the first context increasement is equal to 1, the second context increasement is equal to 2, and the third context increasement is equal to 0.

16. The non-transitory computer-readable storage medium of claim 15, wherein the first block is a coding unit;
wherein three different context increasements corresponding to the three different coding modes are applicable to the first bin, and each coding mode corresponds to a single context increasement;
wherein a same context increasement is used for the first bin of the bin string of the first syntax element for the first block in case that the first block is coded using the IBC mode and a second bin of the bin string of the first syntax element for a second block which is coded using the normal inter mode, the same context increasement is used for the first bin of the bin string of the first syntax element for the first block in case that the first block is coded using the IBC mode and a bin of a second syntax element for a third block that specifies whether the resolution of the motion vector difference is 1/4 of a luma sample or is specified by the first syntax element, and wherein the third block is coded using the affine inter mode, or the same context increasement is used for the first bin of the bin string of the first syntax element for the first block in case that the first block is coded using the normal inter mode and a bin of the second syntax element for a fourth block that specifies whether the resolution of the motion vector difference is 1/4 of a luma sample or is specified by the first syntax element, and wherein the fourth block is not coded using the affine inter mode; and
wherein in an initialization process, a value of a context index for the first syntax element is in a range from 0 to 2 in case that a context initialization type is a first type, the value of the context index for the first syntax element is in a range from 3 to 5 in case that the context initialization type is a second type, and the value of the context index for the first syntax element is in a range from 6 to 8 in case that the context initialization type is a third type.

17. A non-transitory computer-readable recording medium storing a bitstream of a video which is generated by a method performed by a video processing apparatus, wherein the method comprises:
generating the bitstream of a first block of the video according to a rule,
wherein the generating is based on an adaptive motion vector resolution (AMVR) tool,
wherein the rule specifies that selection of a context increasement (ctxInc) for a first bin within a bin string of a first syntax element that specifies a resolution of motion vector difference associated with an AMVR shift is derived based on usage of a coding mode for the first block, and wherein the coding mode for the first block is one of an affine inter mode, an intra block copy (IBC) mode, or a normal inter mode which is a non-affine inter mode,
wherein a first context increasement is assigned for the first bin in case the first block is coded using the IBC mode, a second context increasement is assigned for the first bin in case that the first block is coded using the affine inter mode, and a third context increasement is assigned for the first bin in case that the first block is coded using the normal inter mode, and
wherein the first context increasement is equal to 1, the second context increasement is equal to 2, and the third context increasement is equal to 0.

18. The non-transitory computer-readable recording medium of claim 17, wherein the first block is a coding unit;
wherein three different context increasements corresponding to the three different coding modes are applicable to the first bin, and each coding mode corresponds to a single context increasement;
wherein a same context increasement is used for the first bin of the bin string of the first syntax element for the first block in case that the first block is coded using the IBC mode and a second bin of the bin string of the first syntax element for a second block which is coded using the normal inter mode, the same context increasement is used for the first bin of the bin string of the first syntax element for the first block in case that the first block is coded using the IBC mode and a bin of a second syntax element for a third block that specifies whether the resolution of the motion vector difference is 1/4 of a luma sample or is specified by the first syntax element, and wherein the third block is coded using the affine inter mode, or the same context increasement is used for the first bin of the bin string of the first syntax element for the first block in case that the first block is coded using the normal inter mode and a bin of the second syntax element for a fourth block that specifies whether the resolution of the motion vector difference is 1/4 of a luma sample or is specified by the first syntax element, and wherein the fourth block is not coded using the affine inter mode; and
wherein in an initialization process, a value of a context index for the first syntax element is in a range from 0 to 2 in case that a context initialization type is a first type, the value of the context index for the first syntax element is in a range from 3 to 5 in case that the context initialization type is a second type, and the value of the context index for the first syntax element is in a range from 6 to 8 in case that the context initialization type is a third type.

* * * * *